(12) United States Patent
Wang et al.

(10) Patent No.: US 12,084,123 B2
(45) Date of Patent: Sep. 10, 2024

(54) STEERING DEVICE

(71) Applicant: HITACHI ASTEMO, LTD., Hitachinaka (JP)

(72) Inventors: Qixiang Wang, Hitachinaka (JP); Susumu Kimoto, Hitachinaka (JP); Osamu Yoshida, Hitachinaka (JP)

(73) Assignee: HITACHI ASTEMO, LTD., Hitachinaka (JP)

(*) Notice: Subject to any disclaimer, the term of this patent is extended or adjusted under 35 U.S.C. 154(b) by 117 days.

(21) Appl. No.: 17/910,135

(22) PCT Filed: Feb. 3, 2021

(86) PCT No.: PCT/JP2021/003910
§ 371 (c)(1),
(2) Date: Jan. 25, 2023

(87) PCT Pub. No.: WO2021/186933
PCT Pub. Date: Sep. 23, 2021

(65) Prior Publication Data
US 2023/0159090 A1    May 25, 2023

(30) Foreign Application Priority Data
Mar. 16, 2020 (JP) ............................ 2020-045130

(51) Int. Cl.
*B62D 5/04* (2006.01)
*F16H 55/24* (2006.01)

(52) U.S. Cl.
CPC ......... *B62D 5/0454* (2013.01); *B62D 5/0406* (2013.01); *B62D 5/0412* (2013.01); *F16H 55/24* (2013.01)

(58) Field of Classification Search
CPC ..... F16H 55/24; B62D 5/0412; B62D 5/0406; B62D 5/0454
See application file for complete search history.

(56) References Cited

U.S. PATENT DOCUMENTS

2016/0068184 A1\* 3/2016 Kimoto ................. B62D 7/226
   180/444
2017/0274925 A1\* 9/2017 Kimijima ............. B62D 5/0421

FOREIGN PATENT DOCUMENTS

JP    2016-055732 A    4/2016
JP    2017-222257 A    12/2017
(Continued)

OTHER PUBLICATIONS

International Search Report dated Apr. 20, 2021 issued in International Application No. PCT/JP2021/003910, with English translation, 5 pages.
(Continued)

*Primary Examiner* — Terence Boes
(74) *Attorney, Agent, or Firm* — FOLEY & LARDNER LLP

(57) ABSTRACT

A steering device includes: a worm wheel linked to a steering shaft; a worm shaft engaging with the worm wheel; an electric motor supplying rotational force to the worm shaft and including a motor shaft connected to a first end of the worm shaft; a gear housing containing the worm wheel and the worm shaft; a bearing supporting a second end of the worm shaft; a center adjuster that is contained in the gear housing and includes a holder and a collar, wherein the collar is disposed in the holder and retains the bearing so as to allow the bearing to move with respect to the holder in a gear engagement direction; and a biasing member disposed in the center adjuster and structured to bias the bearing in a direction inclined with respect to the gear engagement direction.

11 Claims, 23 Drawing Sheets

(56) References Cited

FOREIGN PATENT DOCUMENTS

| | | |
|---|---|---|
| JP | 2019-007534 A | 1/2019 |
| JP | 2019-210999 A | 12/2019 |
| WO | WO-2019/235153 A1 | 12/2019 |

OTHER PUBLICATIONS

Written Opinion of the International Searching Authority dated Apr. 20, 2021 issued in International Application No. PCT/JP2021/003910, with English translation, 14 pages.

* cited by examiner

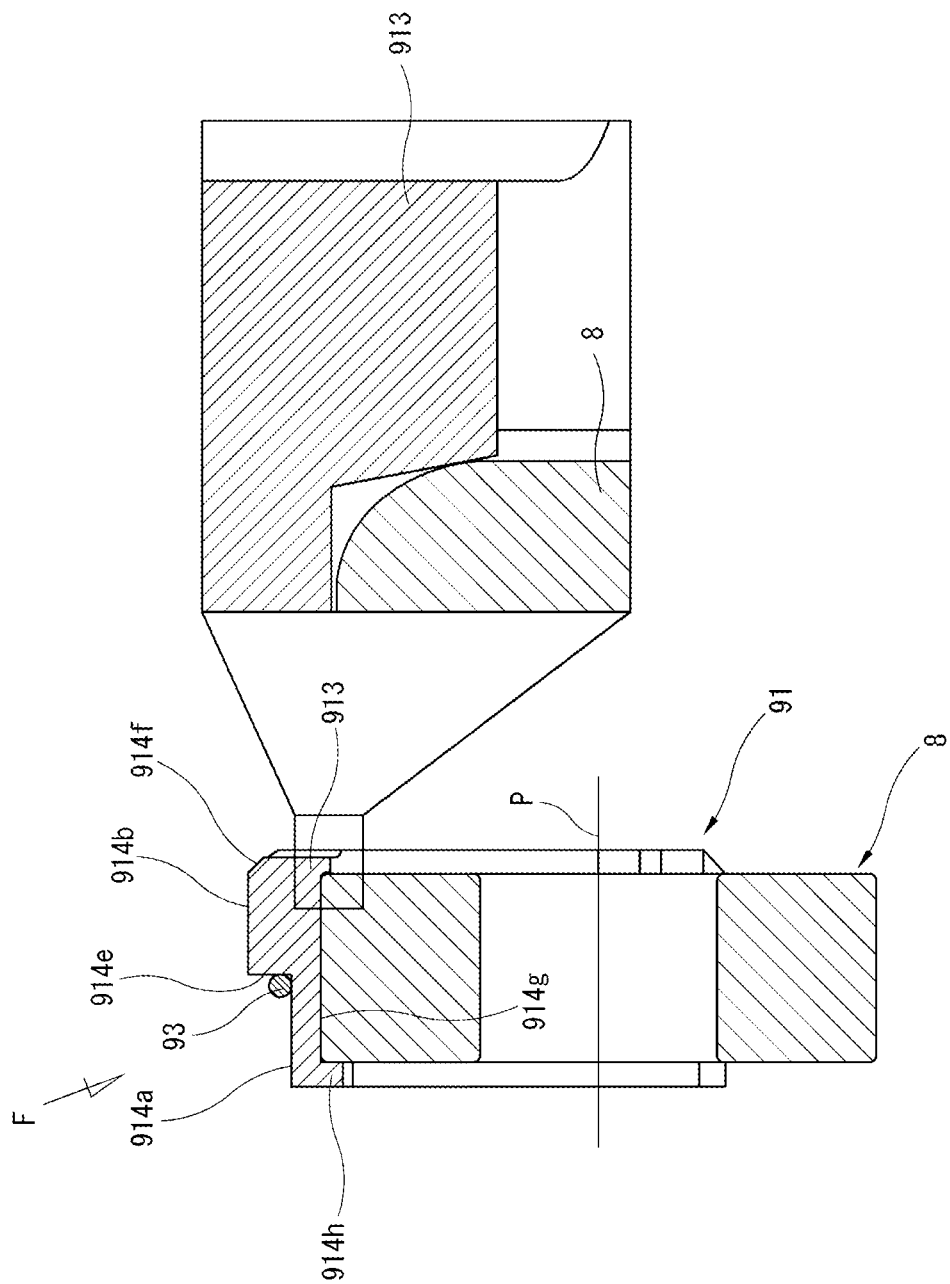

STEERING DEVICE

TECHNICAL FIELD

The present invention relates to a steering device.

BACKGROUND ART

Patent Document 1 below discloses a conventional steering device.

The steering device transmits rotational force as steering assistance force from an electric motor to a steering shaft, via a speed reduction mechanism composed of a worm shaft and a worm wheel. Furthermore, the steering device is structured to adjust a state of engagement between the worm shaft and the worm wheel, by biasing a bearing supporting a tip of the worm shaft toward the worm wheel, with use of a spring.

PRIOR ART DOCUMENT(S)

Patent Document(s)

Patent Document 1: JP 2017-222257 A

SUMMARY OF THE INVENTION

Problem(s) to be Solved by the Invention

However, the conventional steering device above has a problem of changing an action direction of reaction force generated in the worm gear, depending on whether the worm shaft is in positive rotation or negative rotation, especially in case that the worm shaft and the worm wheel are not right-angled in torsion angle therebetween. This may produce a backlash between the worm shaft and the worm wheel upon switching of the worm shaft between positive rotation and negative rotation, and thereby cause a noise due to the backlash.

In view of the foregoing technical problem of the conventional steering device, it is desirable to provide a steering device structured to suppress a backlash between a worm shaft and a worm wheel.

Means for Solving the Problem(s)

According to one aspect of the present invention, a bearing retained by a center adjuster is biased by a biasing member in a direction inclined with respect to a direction of gear engagement between a worm shaft and a worm wheel.

Effect(s) of the Invention

The present invention serves to suppress a backlash between a worm shaft and a worm wheel.

BRIEF DESCRIPTION OF THE DRAWINGS

FIG. 12A is a planar view of the collar assembly unit.
FIG. 12B is a bottom view of the collar assembly unit.
FIG. 13 is a sectional view along a line E-E of FIG. 12.

MODE(S) FOR CARRYING OUT THE INVENTION

The following details an embodiment of a steering device according to the present invention, with reference to the drawings. The embodiment shows an example of the steering device employed in an automobile as conventional.
(Explanation for Steering Device)

Figure 1:
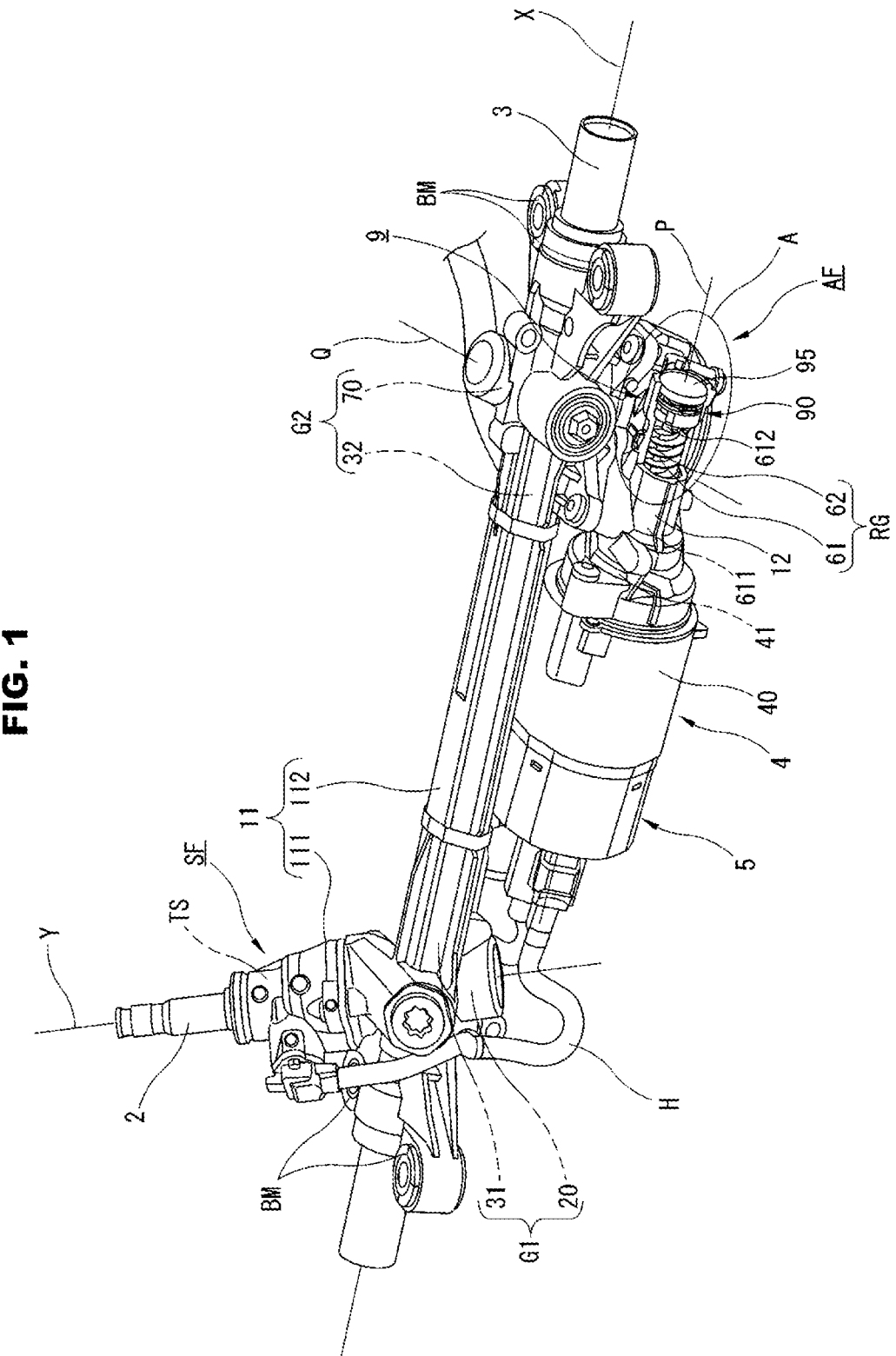
FIG. 1 is a perspective view showing an exterior of a steering device according to the present invention.
Figure 2:
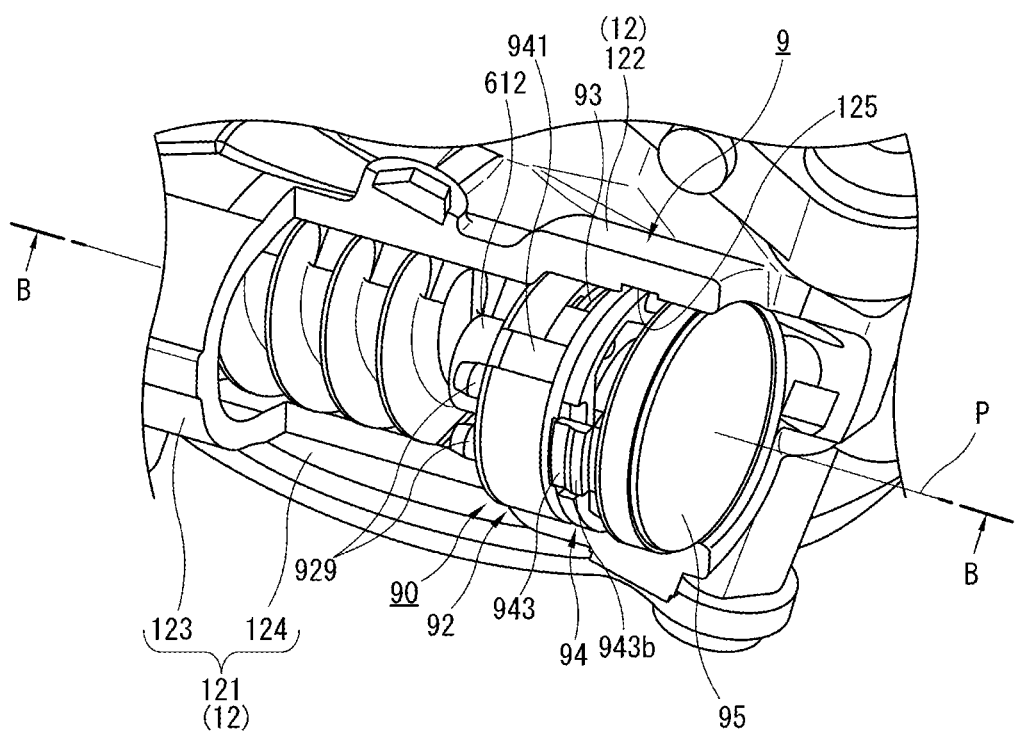
FIG. 2 is an enlarged view of a region A of FIG. 1.
Figure 3:
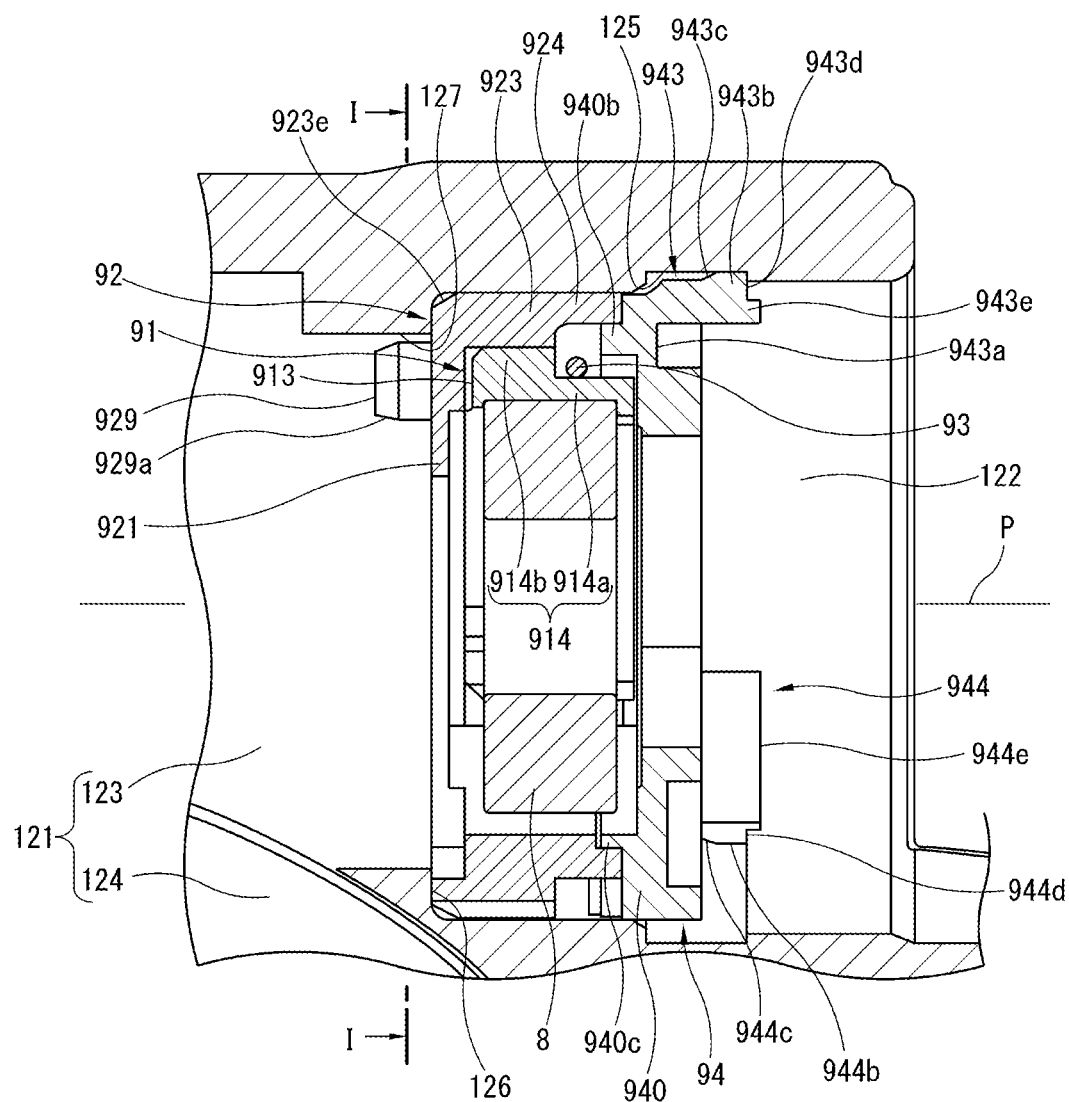
FIG. 3 is a sectional view along a line B-B of FIG. 2.

FIGS. 1 to 3 show the steering device according to the embodiment of the present invention. FIG. 1 is a perspective view showing an exterior of the steering device. FIG. 2 is a partial enlarged view of FIG. 1, which enlarges a region A of FIG. 1. FIG. 3 is a sectional view along a line B-B of FIG. 2, which shows a mounting state of a center adjuster 90 to a center adjuster retainer 122 where a worm gear and a seal member 95 are omitted.

The steering device shown in FIG. 1 is a so-called dual pinion type steering device structured to receive input of steering force via a first pinion gear G1 and input of steering assistance force for assistance of the steering force via a second pinion gear G2. Specifically, the steering device includes a steering mechanism SF and a steering assistance mechanism AF, wherein steering mechanism SF performs steering by transmitting the steering force inputted to a steering wheel not shown to turning wheels, and steering assistance mechanism AF supplies the steering assistance force to steering mechanism SF (in detail, rack shaft 3 described below) depending on the steering force. In addition, the steering device is mounted and fixed to a vehicle body not shown via bushes BM disposed in an outside part of a steering mechanism housing 11 containing steering mechanism SF.

Steering mechanism SF includes the steering mechanism housing 11, a steering shaft 2, and a rack shaft 3. Steering mechanism housing 11 includes steering shaft container 111 and a rack shaft container 112 formed integrally. Steering shaft 2 is rotatably contained in steering shaft container 111. Rack shaft 3 is contained in rack shaft container 112 movably in a direction of an axis X. In addition, steering shaft container 111 includes a known torque sensor TS that measures a steering torque inputted to steering shaft 2.

Steering shaft 2 extends in a direction of an axis Y obliquely to rack shaft 3, and includes a first end in the axis Y direction (i.e., an upper end in FIG. 1) linked to the steering wheel so as to rotate in response to rotation of the steering wheel. Furthermore, steering shaft 2 includes a second end opposite to the first end in the axis Y direction (i.e., a lower end in FIG. 1), and includes first pinion teeth 20 formed in an outer periphery of the second end.

Although the present embodiment shows steering shaft 2 as a single unit directly connecting the steering wheel to rack shaft 3, the steering shaft according to the present invention is not limited to such configuration. For example, instead of the one directly connecting the steering wheel to rack shaft 3, the steering shaft according to the present invention may be one structured for a so-called steer-by-wire type steering device in which the steering shaft is dividable and transmits and shutdown rotation of the steering wheel via a clutch etc.

Rack shaft 3 substantially horizontally extends in the axis X direction, and includes first rack teeth 31 and second rack teeth 32 respectively within predetermined ranges in the axis X direction. First rack teeth 31 engage with first pinion teeth 20 of steering shaft 2. Second rack teeth 32 engage with second pinion teeth 70 of a transmission shaft 7 described below. Thus, rack shaft 3 moves in the axis X direction in response to rotation of steering shaft 2 and transmission shaft 7. Furthermore, rack shaft 3 includes ends in the axis X direction both of which are connected via tie rods not shown to steering knuckle arms not shown linked to the right and left turning wheels not shown. Thus, the movement of rack shaft 3 in the axis X direction pushes and pulls the steering knuckle arms, and changes a direction of the turning wheels. In addition, first pinion teeth 20 and first rack teeth 31 compose first pinion gear G1, and second pinion teeth 70 and second rack teeth 32 compose second pinion gear G2.

Steering assistance mechanism AF includes an electric motor 4, a control unit 5, and a speed reduction mechanism RG. Electric motor 4 generates the steering assistance force. Control unit 5 controls driving of electric motor 4. Speed reduction mechanism RG performs speed reduction of rotational force of the steering assistance force and transmits it to steering mechanism SF (in detail, rack shaft 3). Although the present embodiment shows an example of connecting speed reduction mechanism RG to rack shaft 3 and providing the steering assistance force to rack shaft 3, the present invention is not limited to such configuration. For example, instead of the dual pinion type steering device according to the present embodiment configured to connect speed reduction mechanism RG to rack shaft 3 via transmission shaft 7, the present invention may be applied to a single pinion type steering device that includes first pinion gear G1 alone and is configured to connect speed reduction mechanism RG to steering shaft 2 and supply the steering assistance force to steering shaft 2.

Electric motor 4 includes a motor element not shown, a motor housing 40, and a motor shaft 41. Motor housing 40 contains the motor element. Motor shaft 41 extends in a direction of an axis P being substantially parallel with axis X, and outputs rotation of the motor element. Furthermore, motor shaft 41 is connected to a worm shaft 61 described below of speed reduction mechanism RG, via a known shaft coupling not shown.

Control unit 5 is disposed in a side of electric motor 4 opposite to motor shaft 41, and is integrated with electric motor 4. Furthermore, control unit 5 is electrically connected to various sensors such as torque sensor TS via a sensor harness H, and controls driving of electric motor 4 based on vehicle operation information, such as a steering torque signal, outputted from the various sensors.

As shown in FIG. 2 and enlarged in FIG. 2, speed reduction mechanism RG includes a worm gear composed of worm shaft 61 and a worm wheel 62 engaging with worm shaft 61. Worm shaft 61 and worm wheel 62 are contained in a gear housing 12 attached to an outside part of steering mechanism housing 11 (in detail, rack shaft container 112). Gear housing 12 includes a worm gear container 121 and a center adjuster retainer 122. Worm gear container 121 contains the worm gear. Center adjuster retainer 122 is disposed adjacently to worm gear container 121, and includes in its interior a center adjuster containing space formed to contain a center adjuster 90 described below. Furthermore, worm gear container 121 extends in the direction of axis P being a rotational axis of electric motor 4, and includes a worm shaft container 123 and a worm wheel container 124. Worm shaft container 123 contains worm shaft 61. Worm wheel container 124 contains worm wheel 62, and is disposed adjacently to worm shaft container 123.

Worm shaft 61 extends in the axis P direction coaxially with motor shaft 41, and includes a worm first end 611 and a worm second end 612 in the axis P direction. Worm first end 611 is connected to motor shaft 41 via the known shaft coupling not shown. Worm second end 612 is supported by a bearing 8. Bearing 8 is, for example, a ball bearing.

Worm wheel 62 is fixed to a first end of transmission shaft 7 linked to rack shaft 3, and is structured to rotate integrally with transmission shaft 7. This allows rotation of worm wheel 62 to be transmitted to rack shaft 3 via transmission shaft 7. Transmission shaft 7 is inclined with respect to rack shaft 3 similarly to steering shaft 2, and includes second pinion teeth 70 engaging with second rack teeth 32, wherein second pinion teeth 70 are disposed in an outer periphery of a second end of transmission shaft 7 opposite to the first end. Thus, second pinion gear G2 composed of second rack teeth 32 and second pinion teeth 70 is allowed to transmit rotation of worm wheel 62 to rack shaft 3 via transmission shaft 7, while converting the rotation into movement of rack shaft 3 in the axis X direction.

Worm shaft 61 and worm wheel 62 composing speed reduction mechanism RG may have a gap therebetween (i.e., between their teeth) due to wear. In view of this, the steering device includes a center adjustment mechanism 9 structured to bias worm shaft 61 toward worm wheel 62 and thereby adjust a state of engagement between worm shaft 61 and worm wheel 62.

Center adjustment mechanism 9 includes center adjuster 90 retained by center adjuster retainer 122 that is formed in gear housing 12 so as to surround worm second end 612 of worm shaft 61. Center adjuster retainer 122 includes an open end in the axis P direction, wherein the open end is liquid-tightly closed by a seal member 95 having a substantially disk shape. Seal member 95 is fixed to the open end of center adjuster retainer 122 by press-fitting.

Center adjuster 90 is contained and retained in center adjuster retainer 122, and is biased toward worm wheel 62 by a wire spring 93 being a biasing member disposed in center adjuster 90. Center adjuster 90 includes a collar 91 and a holder 92. Collar 91 retains an outer periphery of bearing 8. Holder 92 has a shape of a bottomed tube, and contains collar 91 so as to allow collar 91 to slide toward worm wheel 62. This allows center adjuster 90 to bias bearing 8 toward worm wheel 62 via collar 91 with use of biasing force of wire spring 93, and thereby bias worm shaft 61 toward worm wheel 62.

Holder 92 surrounding an outer periphery of center adjuster 90 has a cross section (i.e., a section orthogonal to axis P) being substantially circular, while center adjuster retainer 122 including the center adjuster retainer space in its interior has a tubular shape and has a cross section (i.e., a section orthogonal to axis P) being substantially circular. Accordingly, center adjuster 90 includes an outer peripheral surface being in contact with an inner peripheral surface of center adjuster retainer 122, and this determines a position of center adjuster 90 with respect to center adjuster retainer 122.

Holder 92 having the shape of bottomed cylindrical tube includes an open end closed by a lid 94. Holder 92 and lid 94 have therebetween a space filled with grease not shown. The grease is lubricant that allows collar 91 to slide inside the holder 92 under lubrication.

(Explanation for Center Adjuster)

FIGS. 4 to 21 show the center adjuster of the steering device according to the embodiment of the present invention. For convenience, the following description refers to a direction along axis P (shown in FIG. 3) as an axial direction, and refers to a direction perpendicular to axis P as a radial direction, and refers to a direction around axis P as a circumferential direction.

Figure 4:
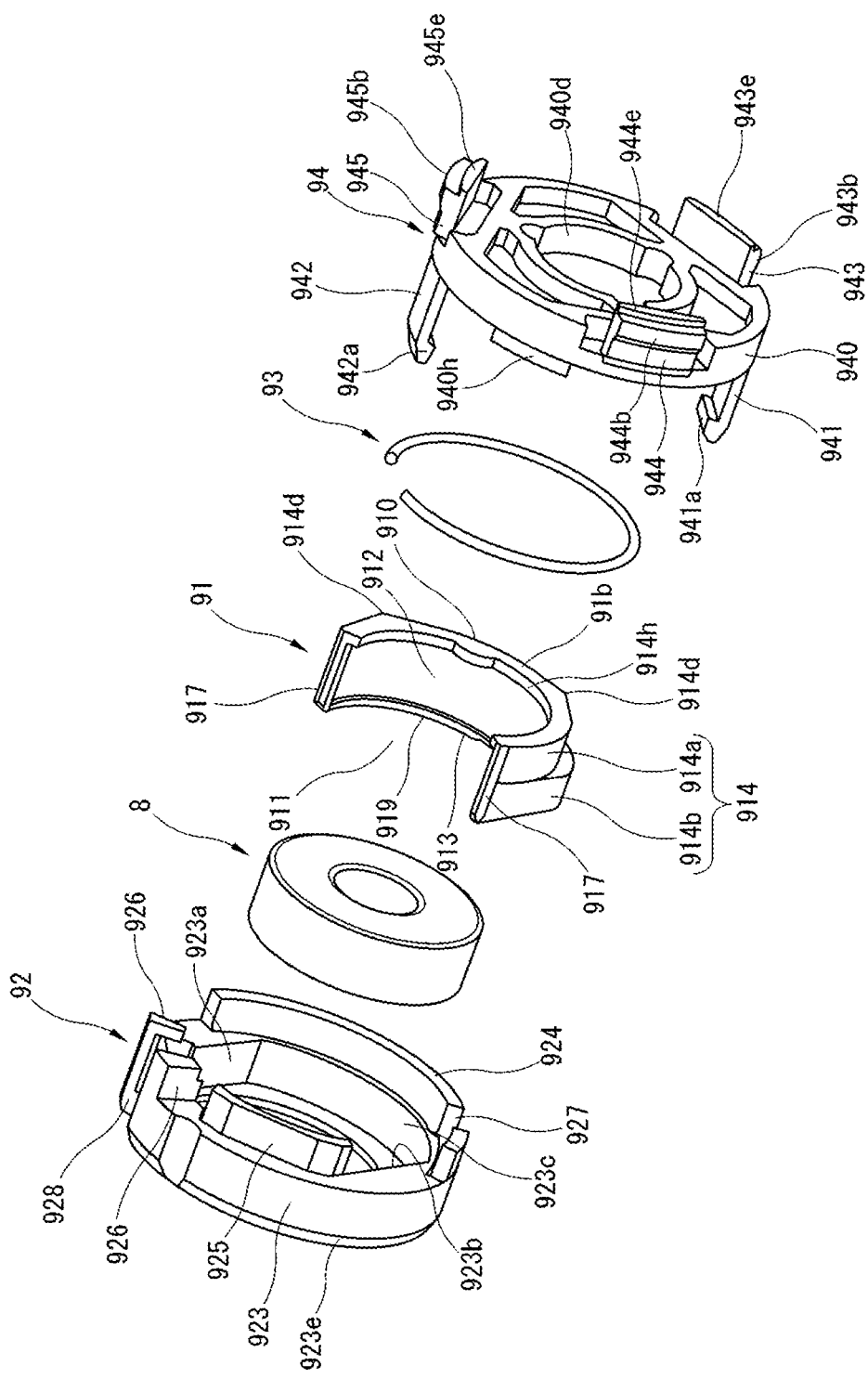
FIG. 4 is an exploded perspective view of a center adjuster shown in FIG. 3.
Figure 5:
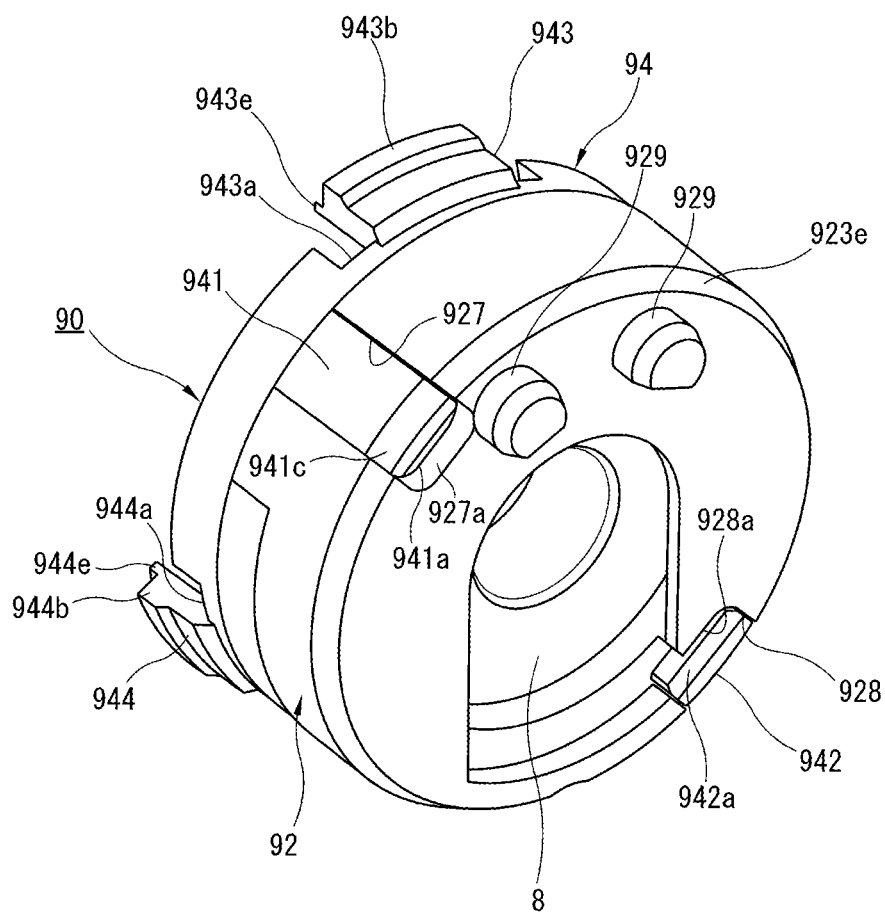
FIG. 5 is a perspective view of the center adjuster in FIG. 3 when viewed from a side of a holder.
Figure 6:
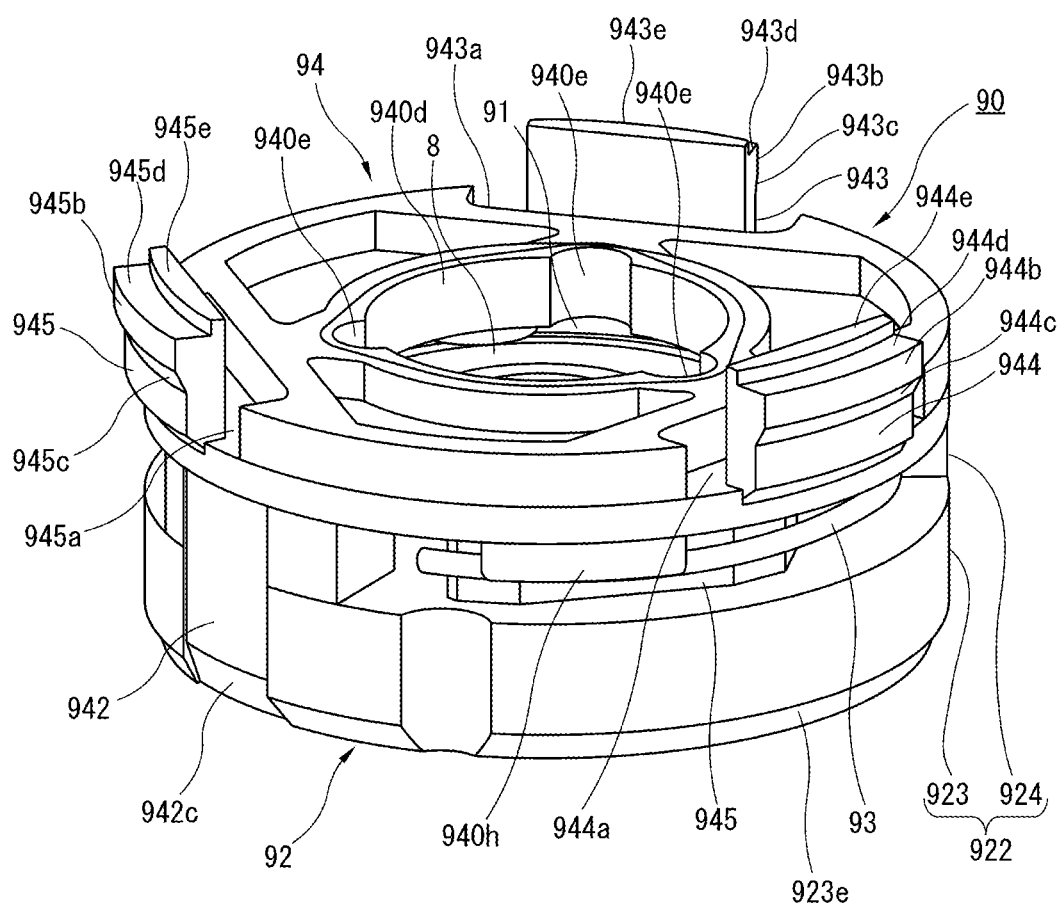
FIG. 6 is a perspective view of the center adjuster in FIG. 3 when viewed from a side of a lid.
Figure 7:
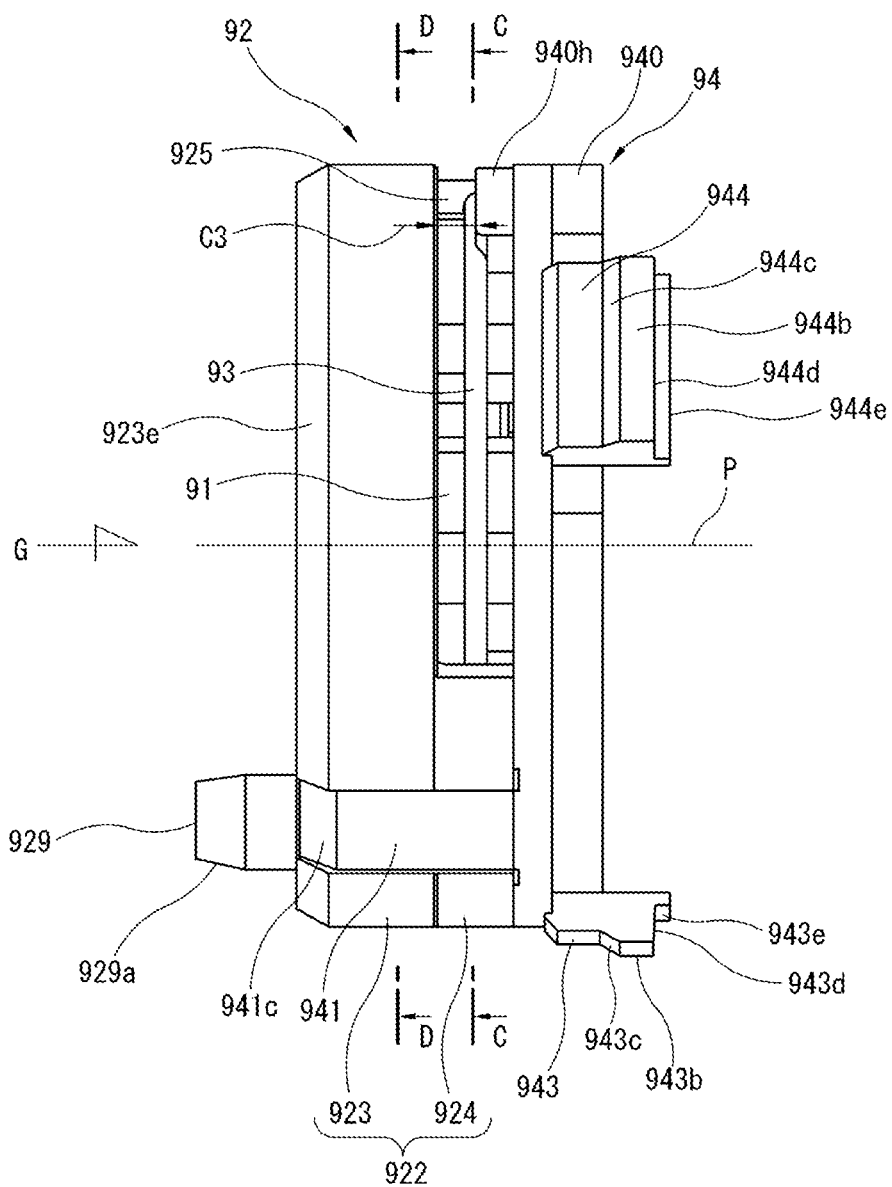
FIG. 7 is a side view of the center adjuster in FIG. 3.
Figure 8:
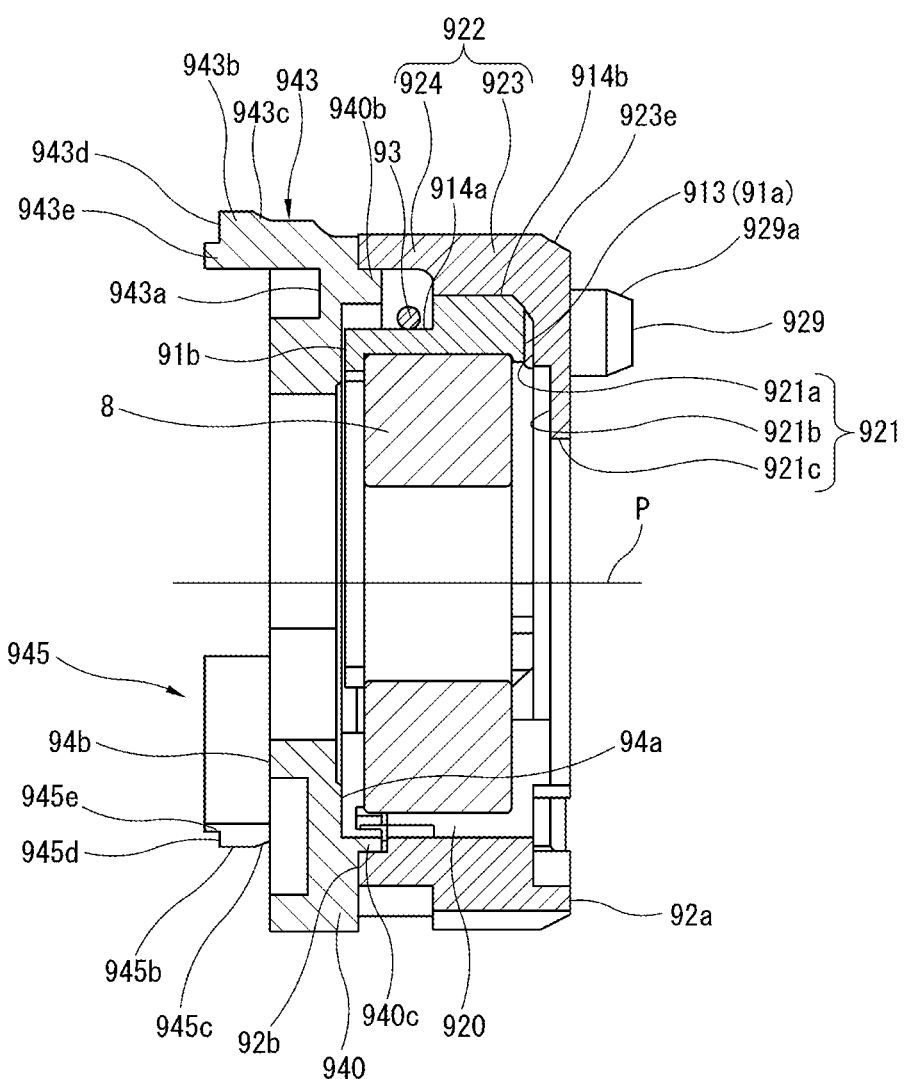
FIG. 8 is a sectional view of the center adjuster in FIG. 7 along an axial direction thereof.
Figure 9:
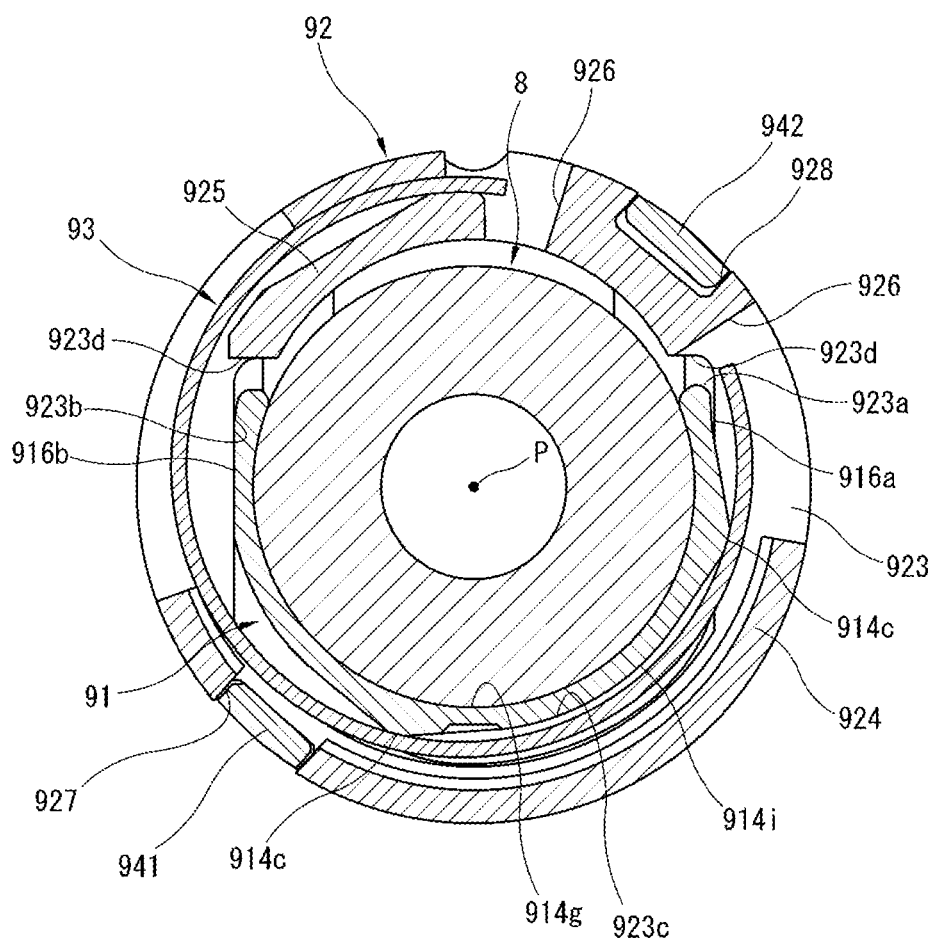
FIG. 9 is a sectional view along a line C-C of FIG. 7.
Figure 10:
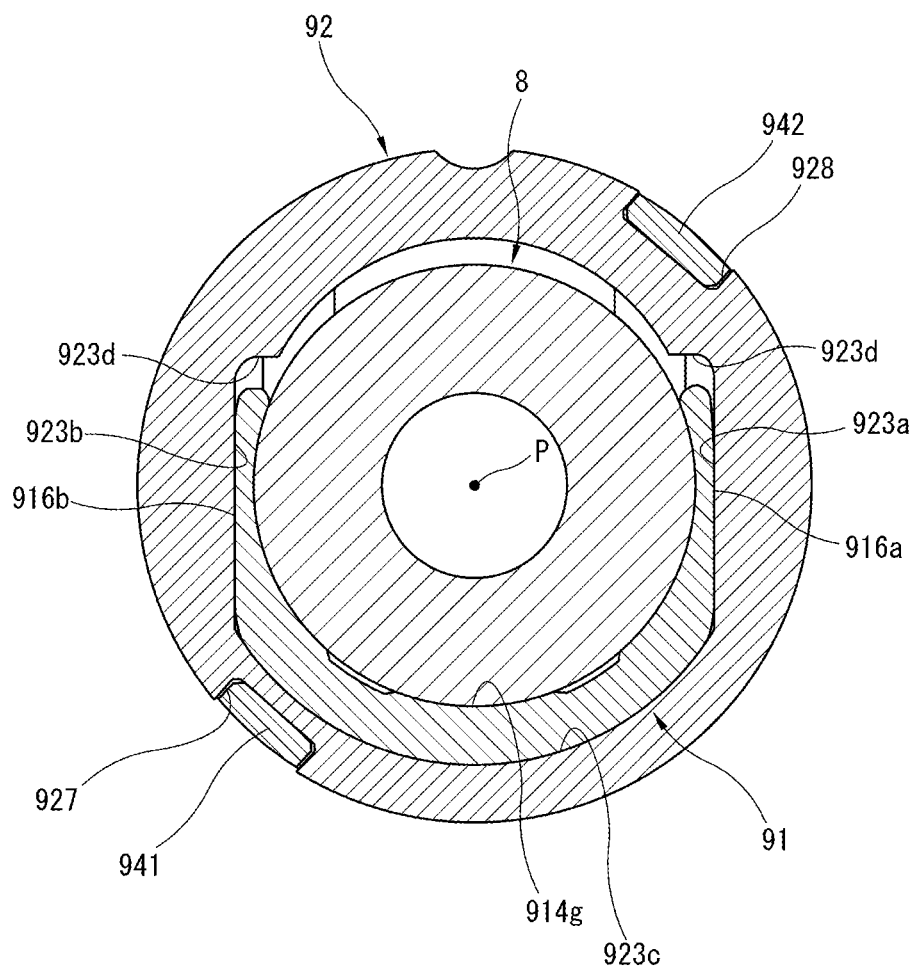
FIG. 10 is a sectional view along a line D-D of FIG. 7.

FIG. 4 is an exploded perspective view of center adjuster 90. FIG. 5 is a perspective view of center adjuster 90 when viewed from a side of holder 92. FIG. 6 is a perspective view of center adjuster 90 when viewed from a side of lid 94. FIG. 7 is a side view of center adjuster 90. FIG. 8 is a sectional view of center adjuster 90 along the axial direction. FIG. 9 is a sectional view along a line C-C of FIG. 7. FIG. 10 is a sectional view along a line D-D of FIG. 7. These FIGS. 4 to 10 are drawings to show general configurations of center adjuster 90, and are referred to as appropriate in explanation for FIGS. 11 to 21 described below.

As shown in FIGS. 4 to 10, center adjuster 90 includes bearing 8, collar 91, holder 92, wire spring 93, and lid 94 which are assembled and integrated into center adjuster 90. Collar 91 has a substantially U-shape in planar view, and is fitted to the outer periphery of bearing 8, as a part of collar 91. Holder 92 substantially has the shape of the bottomed cylindrical tube, and includes a collar container 920 shaped concave in an inner peripheral side of holder 92, and contains a collar assembly unit 90S in collar container 920. Collar assembly unit 90S is movable relatively with respect to holder 92 in a direction of engagement between worm shaft 61 and worm wheel 62 (i.e., a direction M shown in FIG. 23) which is simply referred to as "gear engagement direction" in the following.

Wire spring 93 has an arc shape (specifically, a C-shape) in planar view, and is interposed between collar 91 and holder 92 (i.e., in a gap in the radial direction), and biases bearing 8 toward worm wheel 62 via collar 91 with binding force of wire spring 93 itself. Wire spring 93 according to the present invention is structured to bias bearing 8 via collar 91 in a direction (i.e., a direction N in FIG. 23) inclined with respect to the gear engagement direction (i.e., direction M in FIG. 23), where a force in the inclined direction (direction N) includes a biasing force in the gear engagement direction (direction M) as a component force.

Lid 94 is disposed to cover an axial opening of collar container 920 of holder 92, and is locked and fixed to holder 92 via a plurality of (e.g., two in the present embodiment) holder retainers, i.e., a first holder retainer 941 and a second holder retainer 942 that are disposed in an outer periphery of lid 94. As shown in FIG. 3, the outer periphery of lid 94 further includes a plurality of (e.g., three in the present embodiment) lid engagement parts, i.e., a first lid engagement part 943, a second lid engagement part 944, and a third lid engagement part 945 that are bendable in the radial direction. The first, second, and third lid engagement parts 943, 944, and 945 engage with a center adjuster locking groove 125 formed in center adjuster retainer 122 of gear housing 12, and fix the lid 94 to center adjuster retainer 122. Center adjuster locking groove 125 is an concave annular groove extending in the circumferential direction in an inner peripheral surface of center adjuster retainer 122, where first lid engagement part 943, second lid engagement part 944, and third lid engagement part 945 respectively include in their outer peripheral edges a first lid engagement projection 943b, a second lid engagement projection 944b, and a third lid engagement projection 945b that engage with center adjuster locking groove 125 so as to restrict movement of lid 94 in the axial direction inside center adjuster retainer 122.

Figure 11:
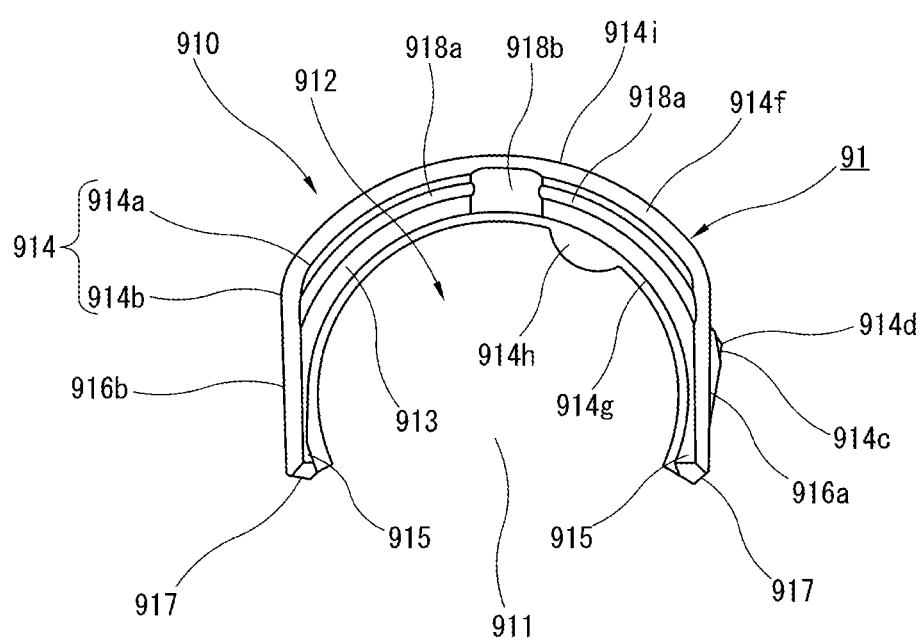
FIG. 11 is a planar view of a collar shown in FIG. 4.
Figure 12A:
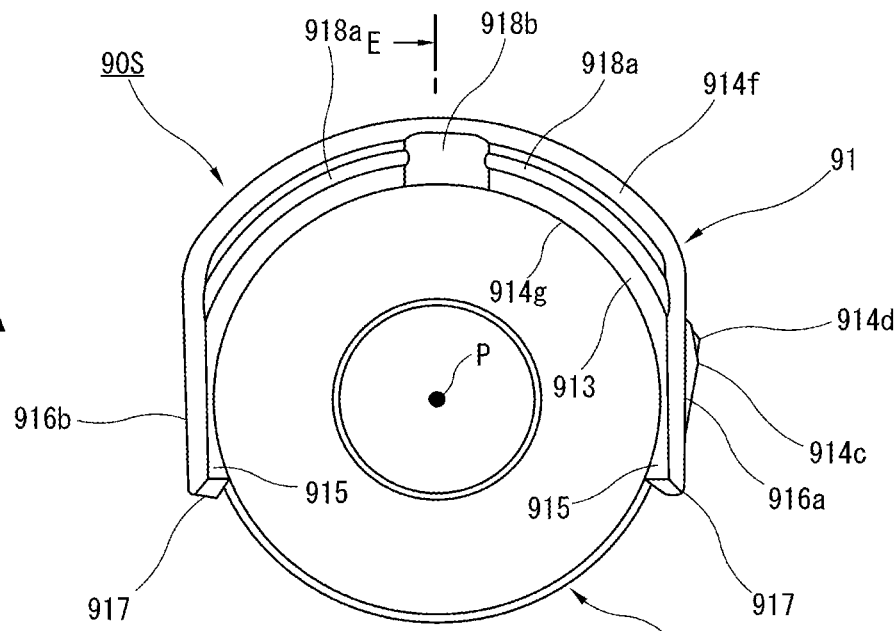
FIGS. 12A and 12B show a collar assembly unit formed by integrating the collar and a bearing.
Figure 12B:
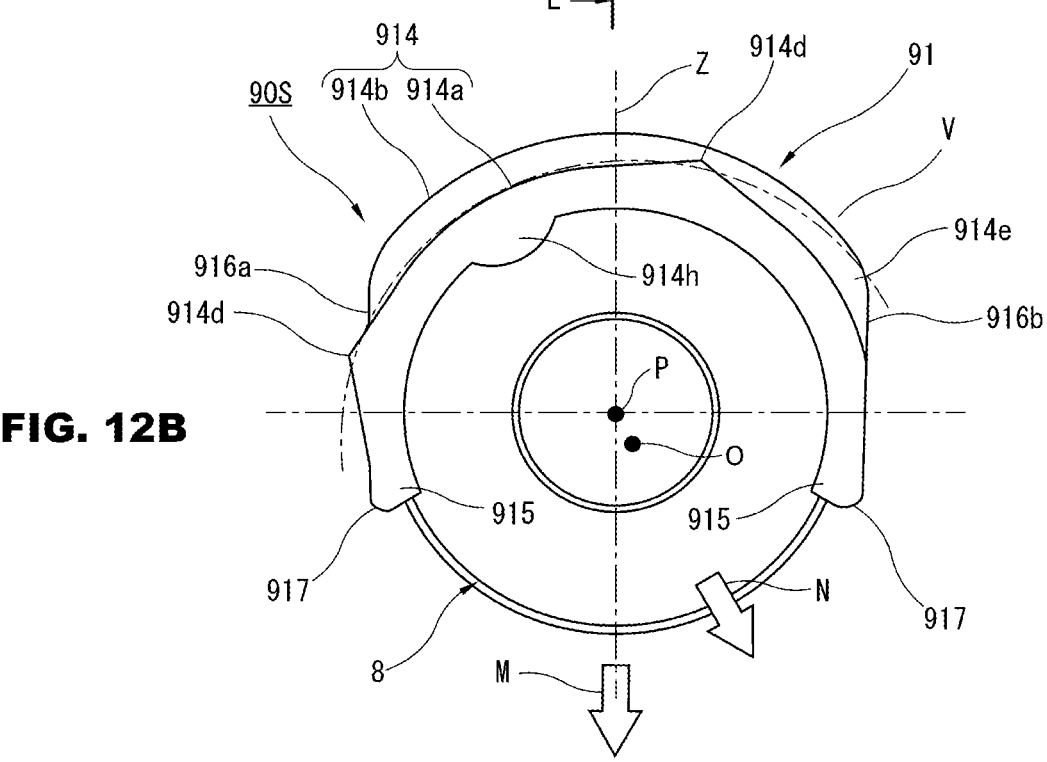
Figure 14:
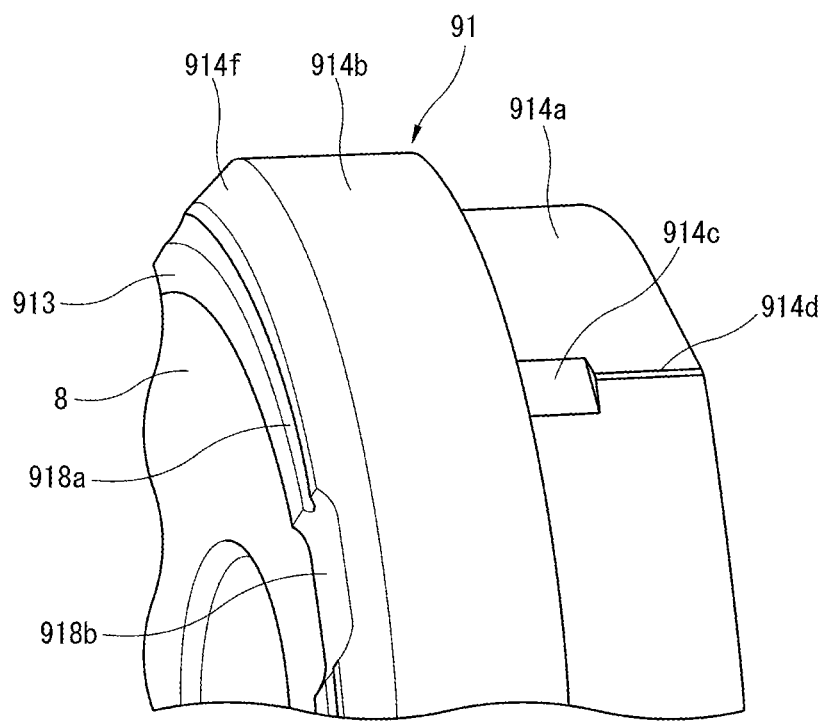
FIG. 14 is a view in a direction of an arrow F of FIG. 13.

FIG. 11 is a planar view of collar 91. FIGS. 12A and 12B show collar assembly unit 90S formed by integrating collar 91 and bearing 8. FIG. 12A is a planar view of collar assembly unit 90S. FIG. 12B is a bottom view of collar assembly unit 90S. FIG. 13 is a sectional view along a line E-E of FIG. 12. FIG. 14 is a view in a direction of an arrow F of FIG. 13.

As shown in FIGS. 11, 12A, and 12B, collar 91 is made of a resin less in friction coefficient than materials of holder 92 and lid 94, and has a substantially U-shape in planar view, and includes a collar body 910 having the U-shape and an opening 911 being open in the radial direction due to the U-shape of collar body 910. For convenience of explanation, out of end surfaces of collar 91 in the axial direction, one end surface facing a holder bottom 921 described below is referred to as a collar first end surface 91a, and the other end surface facing a lid body 940 described below is referred to as a collar second end surface 91b.

Collar body 910 has the arc shape that surrounds bearing 8 to cover a circumferential range greater than a half circumference of an outer periphery of bearing 8, except a circumferential range overlapping with opening 911. Inside the arc shape, collar body 910 includes a bearing retainer 912 having an inner diameter slightly smaller than an outer diameter of bearing 8. In detail, bearing retainer 912 in a natural state before installing bearing 8 to bearing retainer 912 is smaller in inner diameter than bearing retainer 912 after installing bearing 8 to bearing retainer 912. Accordingly, bearing retainer 912 exerts biasing force (i.e., elastic force) on a contact part with bearing 8 radially inwardly toward a center of bearing 8, and retains bearing 8 with the biasing force (the elastic force). In other words, bearing retainer 912 has a predetermined interference for the biasing force (the elastic force), and retains bearing 8 with use of the interference.

Collar body 910 includes a collar bottom 913 and a collar peripheral wall 914. Collar bottom 913 forms collar first end surface 91a, and is in contact with an axial first end of bearing 8. Collar peripheral wall 914 rises from an outer peripheral edge of collar bottom 913, and surrounds the outer periphery of bearing 8. Collar bottom 913 extends continuously in the circumferential direction with a substantially constant radial width, and, as enlarged in FIG. 13, includes a slope being in contact with the axial first end of bearing 8, wherein the slope is inclined such that collar peripheral wall 914 gradually increases in inner diameter with increase in distance from collar bottom 913. Thus, the slope of collar bottom 913 is in contact with an outer peripheral edge of the axial first end of bearing 8. This allows biasing force to be exerted on bearing 8 in the axial direction and the radial direction. Collar peripheral wall 914 includes a spring winding part 914a and a protrusion part 914b. Spring winding part 914a is positioned oppositely to collar bottom 913 in the axial direction, and serves as a part around which wire spring 93 is wound. Protrusion part 914b is positioned nearer to collar bottom 913 than spring winding part 914a in the axial direction, and protrudes with respect to spring winding part 914a outwardly in the radial direction.

As shown in FIG. 13, spring winding part 914a occupies a region overlapping with bearing 8 in the radial direction, and has an axial width greater at least than a radius of a wire of wire spring 93. Spring winding part 914a includes spring contact parts 914c structured to be in contact with wire spring 93, and shaped flat, and formed at a plurality of (e.g., two in the present embodiment) positions in the circumferential direction, in a section axially adjacent to protrusion part 914b in spring winding part 914a. The number of spring contact parts 914c is not limited to two exemplified in the present embodiment, but may be any number equal to or greater than two.

As shown in FIG. 14, each of spring contact parts 914c is formed flat by deleting (i.e., chamfering) a corner of a projection 914d projecting outwardly in the radial direction. Each of spring contact parts 914c includes an axial first end adjacent to protrusion part 914b and an axial second end opposite to protrusion part 914b and adjacent to projection 914d. In other words, spring contact parts 914c are structured such that wire spring 93 is interposed by protrusion part 914b and projections 914d in the axial direction, and thereby locked.

Figure 23:
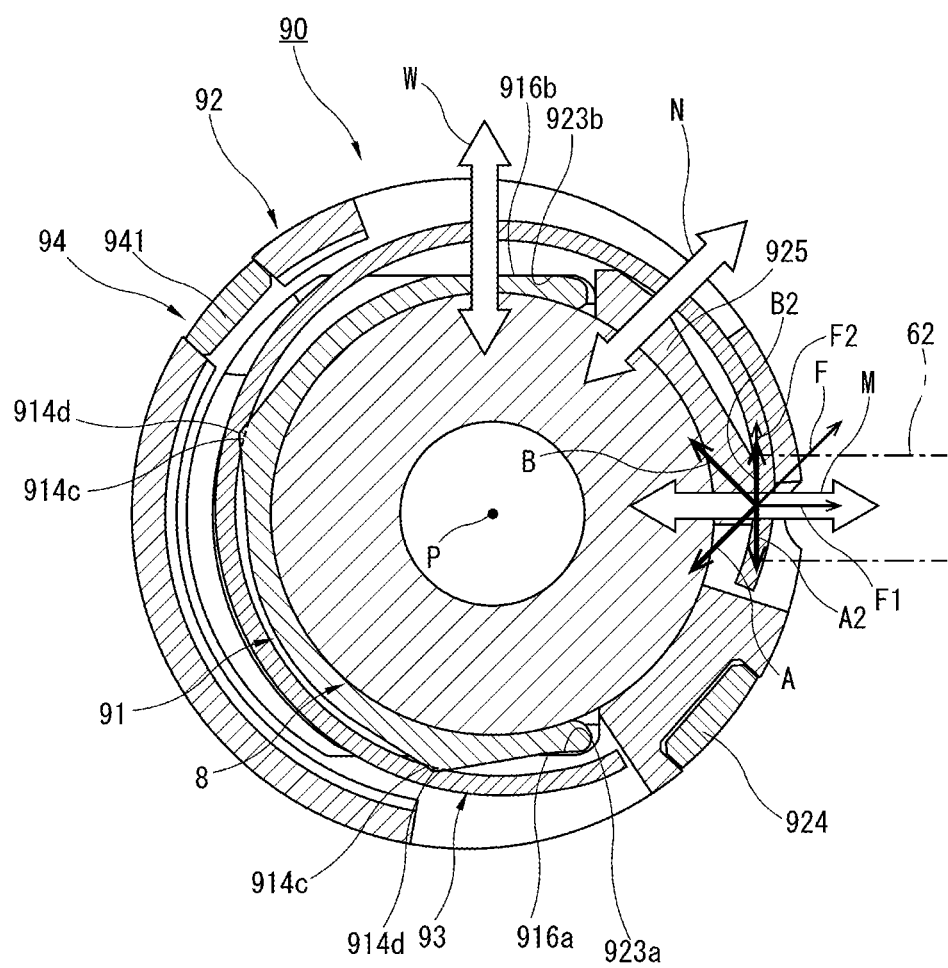
FIG. 23 is a sectional view of the center adjuster corresponding to FIG. 9, which illustrates actions and effects of the center adjuster.

As shown in FIG. 12B, spring contact parts 914c are points of contact with wire spring 93, and are positioned so as to shift a center O with respect to an axis Z, where: center O is a center of a virtual circle V passing through the points of contact with wire spring 93; and axis Z is an axis passing through the rotational axis of worm shaft 61 (i.e., axis P) and extending in the gear engagement direction (i.e., direction M in FIG. 23). This allows collar 91 to be biased in the direction (direction N in FIG. 23) inclined with respect to the gear engagement direction (direction M in FIG. 23) with the biasing force of wire spring 93, as described above.

As shown in FIG. 13, protrusion part 914b extends continuously in the circumferential direction, and has a constant radial width sufficient to form a step 914e with respect to spring winding part 914a such that step 914e is larger than a diameter of the wire of wire spring 93. In other words, protrusion part 914b and spring contact parts 914c interpose therebetween step 914e having a radial width greater at least than the wire diameter of wire spring 93. This prevents wire spring 93 from radially outwardly protruding beyond an outer peripheral surface of protrusion part 914b, when wire spring 93 is in contact with spring contact parts 914c. Furthermore, in an outer peripheral edge of an axial end of protrusion part 914b adjacent to collar bottom 913, protrusion part 914b includes a tapered surface 914f formed by so-called C chamfering to gradually decreases in outer diameter toward collar bottom 913 and extend continuously in the circumferential direction. In addition, tapered surface 914f may be formed to be a curved surface by R-chamfering instead of C-chamfering exemplified in the present embodiment.

Collar peripheral wall 914 includes a peripheral wall 914g and a bearing presser 914h in an inner periphery thereof. Peripheral wall 914g is in contact with the outer peripheral surface of bearing 8. Bearing presser 914h is disposed in an axial end of collar peripheral wall 914 opposite to collar bottom 913, and is in contact with the axial second end surface of bearing 8 such that bearing presser 914h and collar bottom 913 sandwiches bearing 8 therebetween. Furthermore, peripheral wall 914g extends straight in the axial direction, substantially parallel with the outer peripheral surface of bearing 8. Bearing presser 914h is substantially parallels with the axial second end surface of bearing 8 such that the entire part of bearing presser 914h is in contact with the axial Collar body 910 includes in its ends in the circumferential direction a pair of collar engagement parts 915 that holds bearing 8 through a circumferential range wider than a half of the outer circumference around bearing 8 and thereby suppresses bearing 8 from dropping off collar body 910 (in detail, bearing retainer 912). Each of collar engagement parts 915 has a hook-like shape so as to gradually increase in distance from a corresponding one of a holder first slide surface 923a and a holder second slide surface 923b described below. Thus, the pair of collar engagement parts 915 catch bearing 8 and thereby prevent bearing 8 from dropping through the opening 911.

As shown in FIG. 12A, in radially both sides across bearing retainer 912, collar body 910 includes a collar first slide surface 916a and a collar second slide surface 916b being a pair of sliding contact surfaces that allow collar 91 to slide with respect to holder 92. The pair of collar first slide surface 916a and collar second slide surface 916b extend to be tangent to bearing retainer 912 being substantially circular in planar view, and thereby define therebetween a width-across-flats region along which collar 91 slides with respect to holder 92. Specifically, collar first slide surface 916a and collar second slide surface 916b are respectively in sliding contact with holder first slide surface 923a and holder second slide surface 923b described below of holder 92 (in detail, holder tubular wall 922 described below).

Each of the both circumferential ends of collar body 910 includes a slope 917 tapered toward the each of the both circumferential ends. Slopes 917 are slopes defined such that the outer peripheral surface of collar body 910 gradually goes away from collar first slide surface 916a and collar second slide surface 916b, as approaching the both circumferential ends of collar body 910. In other words, slopes 917 are inclined so as to gradually go away from holder first slide surface 923a and holder second slide surface 923b, as approaching the both circumferential ends of collar body 910, in a state in which collar 91 is contained in holder 92. Thus, slopes 917 are chamfered portions tapered toward the both circumferential ends of collar body 910, and may be formed flat by C-chamfering or formed curved by R-chamfering.

Collar body 910 includes a lubrication groove 918 in its axial end face adjacent to collar bottom 913. Lubrication groove 918 serves to retain the grease not shown filling the space between holder 92 and lid 94, and is composed of a circumferential groove 918a and a radial groove 918b. Circumferential groove 918a has a shape of an arc extending continuously in the circumferential direction with a constant width, in planar view. Radial groove 918b has a straight shape extending continuously in the radial direction across a circumferentially middle part of circumferential groove 918a. Circumferential groove 918a pierces an outer surface of collar bottom 913 in the circumferential direction, and includes circumferential ends that respectively open at collar first slide surface 916a and collar second slide surface 916b. Similarly, radial groove 918b pierces the outer surface of collar bottom 913 in the radial direction, and includes a radial first end being open at an outer peripheral edge of collar 91 and a radial second end being open at an inner peripheral edge of collar 91.

Figure 15:
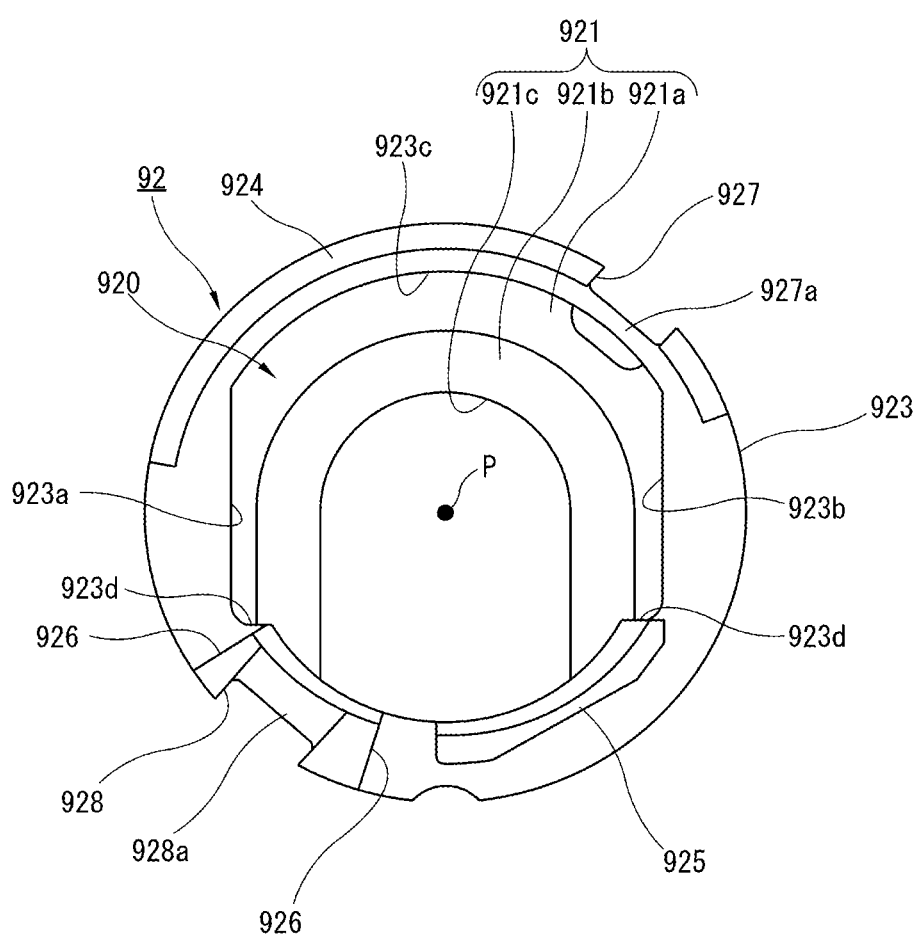
FIG. 15 is a planar view of the holder shown in FIG. 4.
Figure 16:
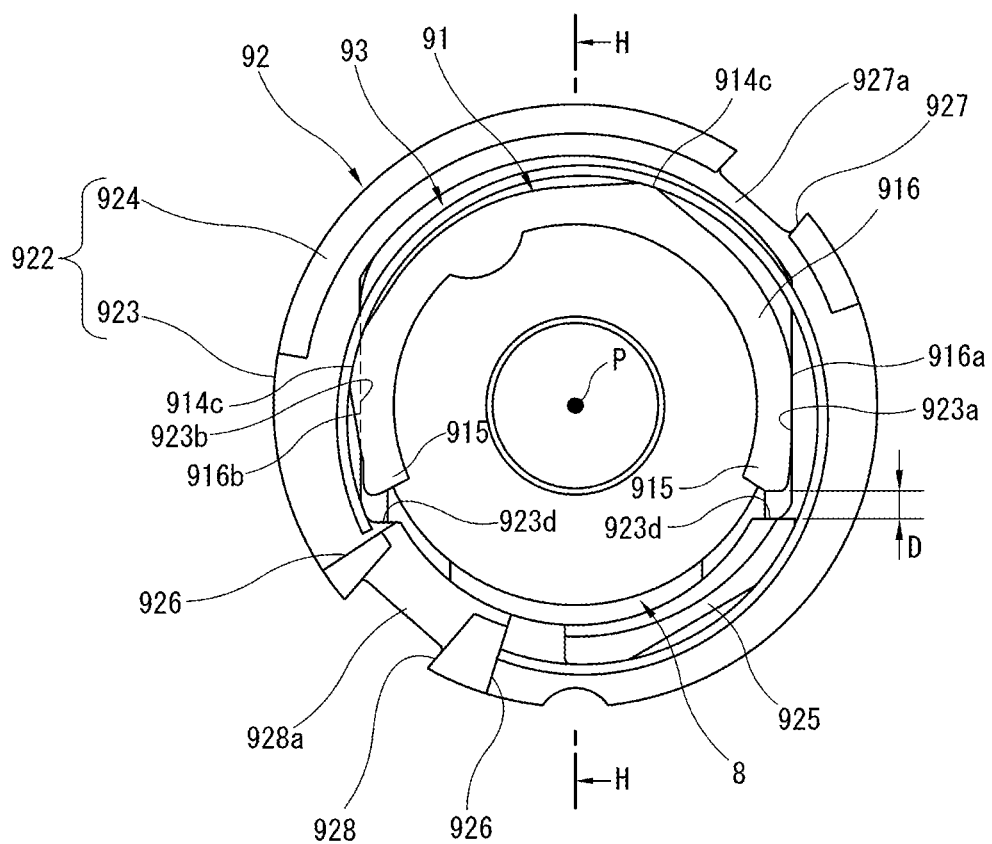
FIG. 16 is a view in a direction of an arrow G of FIG. 7 where the lid of the center adjuster is removed.
Figure 17:
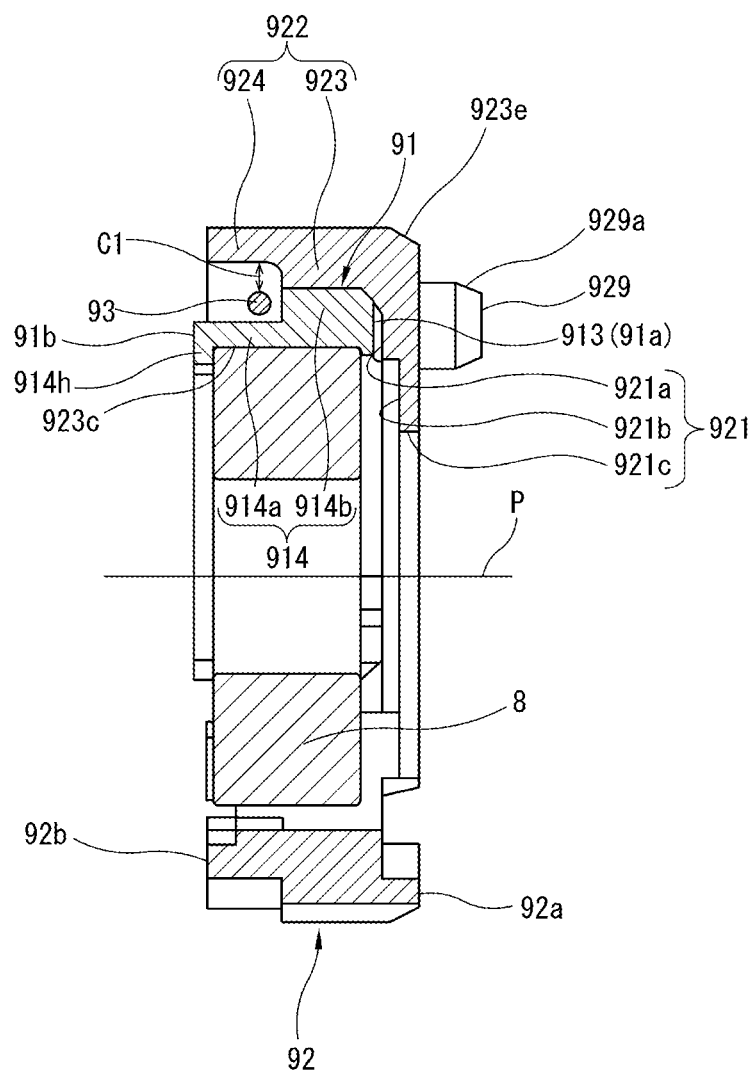
FIG. 17 is a sectional view along a line H-H of FIG. 16.
Figure 18:
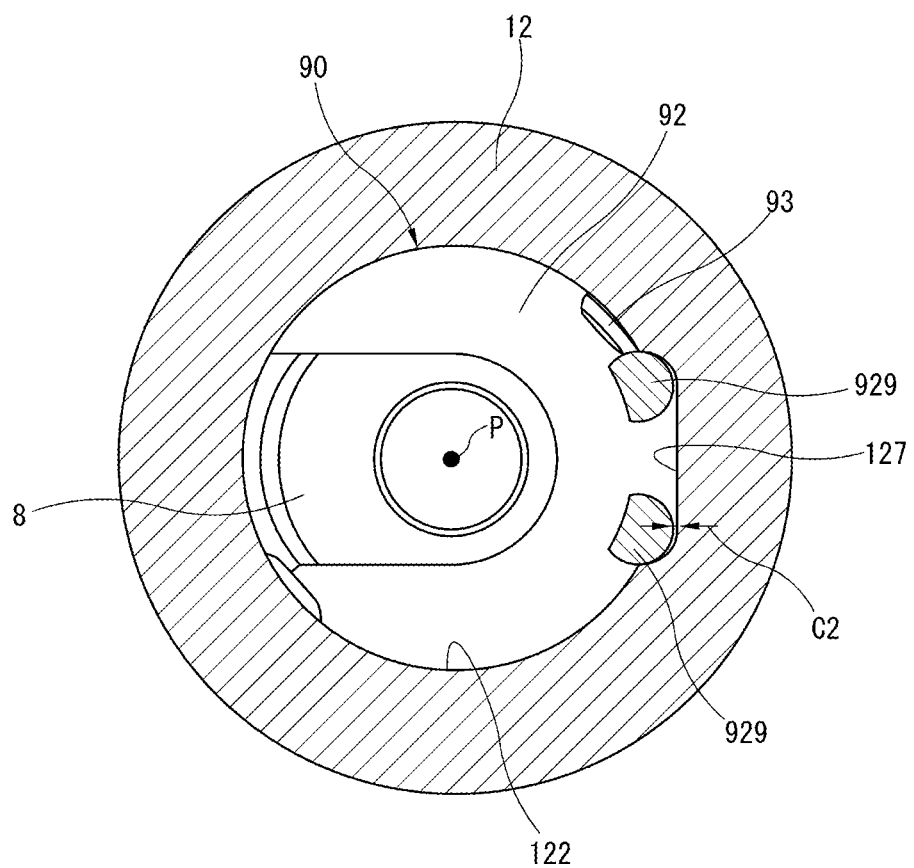
FIG. 18 is a sectional view along a line I-I of FIG. 3.

FIG. 15 is a planar view of holder 92. FIG. 16 is a view in a direction of an arrow G where the lid of center adjuster 90 is removed. FIG. 17 is a sectional view along a line H-H of FIG. 16. FIG. 18 is a sectional view along a line I-I of FIG. 3.

As shown in FIGS. 15 to 17, holder 92 substantially has the shape of bottomed cylindrical tube, and includes in its interior the collar container 920 containing collar 91 slidably. Collar container 920 is defined by a holder bottom 921 and a holder tubular wall 922. Holder bottom 921 is in contact with collar bottom 913 of collar 91. Holder tubular wall 922 extends from holder bottom 921 continuously in the axial direction, and surrounds the outer periphery of collar 91. For convenience of explanation, out of axial ends of holder 92, the one end adjacent to holder bottom 921 is referred to as a holder first end 92a, and the other end opposite to holder bottom 921 is referred to as a holder second end 92b.

Holder bottom 921 includes a collar first sliding-contact surface 921a. Collar first sliding-contact surface 921a is a flat surface substantially corresponding to a projected plane of collar bottom 913, and is in sliding contact with collar first end surface 91a. Holder bottom 921 further includes a holder bottom stepped section 921b and a holder bottom opening 921c. Holder bottom opening 921c is an axial opening formed in an inner circumferential side with respect to collar first sliding-contact surface 921a via holder bottom stepped section 921b formed at a lower level than collar first sliding-contact surface 921a. Worm second end 612 of worm shaft 61 is inserted inside the holder 92 via collar first sliding-contact surface 921a, and is supported by bearing 8 contained in holder 92.

Holder tubular wall 922 includes a holder first tubular wall 923 and a holder second tubular wall 924. Holder first tubular wall 923 overlaps with (i.e., faces) protrusion part 914b of collar 91 in the radial direction. Holder second tubular wall 924 is positioned nearer to holder second end 92b than holder first tubular wall 923 in the axial direction, and overlaps with (i.e., faces) spring winding part 914a of collar 91 in the radial direction.

Holder first tubular wall 923 includes holder first slide surface 923a, holder second slide surface 923b, and a holder-first-tubular-wall concave arc surface 923c. Holder first slide surface 923a and holder second slide surface 923b are a pair of slide surfaces disposed to define a width-across-flats region therebetween. Holder-first-tubular-wall concave arc surface 923c is interposed between holder first slide surface 923a and holder second slide surface 923b in the circumferential direction so as to connect holder first slide surface 923a and holder second slide surface 923b. Furthermore, holder first tubular wall 923 includes a tubular part tapered section 923e adjacently to an outer peripheral edge of holder first end 92a. Tubular part tapered section 923e has a substantially conical shape with an outer diameter that gradually decreases toward holder first end 92a.

Holder first slide surface 923a is parallel with collar first slide surface 916a, and is structured to be in sliding contact with collar first slide surface 916a upon movement of collar 91 in the gear engagement direction. Similarly, holder second slide surface 923b is parallel with collar second slide surface 916b, and is structured to be in sliding contact with collar second slide surface 916b upon movement of collar 91 in the gear engagement direction.

Holder-first-tubular-wall concave arc surface 923c has a concave arc shape corresponding to a collar convex arc surface 914i of collar peripheral wall 914 where collar convex arc surface 914i has a substantially arc shape in planar view. Holder-first-tubular-wall concave arc surface 923c is structured to restrict a maximum amount of retraction of collar 91 in the gear engagement direction (i.e., a direction away from worm wheel 62 in the gear engagement direction), by contacting with collar convex arc surface 914i.

Holder first tubular wall 923 further includes a pair of collar contact parts 923d, 923d in a side opposite to holder-first-tubular-wall concave arc surface 923c across axis P. The pair of collar contact parts 923d, 923d are structured to contact with the both circumferential ends of collar body 910 when collar 91 has traveled a predetermined slide distance in the gear engagement direction. Thus, the pair of collar contact parts 923d, 923d are structured to restrict a maximum amount of advance of collar 91 in the gear engagement direction (i.e., a direction to approach worm wheel 62 in the gear engagement direction), by contacting with the both circumferential ends of collar 91. In other words, the pair of collar contact parts 923d, 923d and the both circumferential ends of collar 91 have a distance D therebetween in a state in which collar 91 is in contact with holder-first-tubular-wall concave arc surface 923c, wherein the distance D is a slidable amount of collar 91, i.e. an engagement adjustable amount of the worm gear, allowed in the center adjustment mechanism.

Holder second tubular wall 924 has a substantially arc shape in planar view, and extends in the circumferential direction, and occupies a circumferential range passing through at least two of spring contact parts 914c of collar 91. According to the present embodiment, the circumferential range occupied by holder second tubular wall 924 overlaps with holder-first-tubular-wall concave arc surface 923c in the axial direction, and is wider than a circumferential range occupied by holder-first-tubular-wall concave arc surface 923c. Holder second tubular wall 924 is diameter-expanded to form a step with respect to holder-first-tubular-wall concave arc surface 923c, and is greater in inner diameter than holder-first-tubular-wall concave arc surface 923c. This forms a predetermined radial gap C1 between holder second tubular wall 924 and wire spring 93 wound around spring winding part 914a of collar 91.

Holder second end 92b includes a spring locking part 925 in a side opposite to holder second tubular wall 924 across a center of holder 92 (i.e., axis P). Spring locking part 925 has a substantially arc shape in planar view, and extends in the circumferential direction, and is structured as a part on which wire spring 93 is locked. In detail, spring locking part 925 occupies a circumferential range facing the two spring contact parts 914c, in a state in which collar 91 is mounted to holder 92.

Furthermore, holder second end 92b includes a spring rotation restricter 926 between collar 91 and holder 92. Spring rotation restricter 926 is in contact with a pair of circumferential ends of wire spring 93 in a state of winding the wire spring 93. Spring rotation restricter 926 occupies a circumferential range corresponding to a circumferential gap formed between the pair of circumferential ends of wire spring 93, and restricts circumferential movement of wire spring 93 in the wound state, by contacting with the pair of circumferential ends of wire spring 93.

Holder 92 includes a plurality of (e.g., two in the present embodiment) retainer engagement grooves: i.e., a pair of first retainer engagement groove 927 and second retainer engagement groove 928 that are a pair of convex grooves extending in the axial direction to engage with a pair of first holder retainer 941 and second holder retainer 942 described below of lid 94. Each of first retainer engagement groove 927 and second retainer engagement groove 928 extends straight in the axial direction through an outer peripheral part of holder tubular wall 922. In detail, first retainer engagement groove 927 is positioned to overlap with holder second tubular wall 924 in the axial direction. Second retainer engagement groove 928 is positioned to overlap with spring rotation restricter 926 in the axial direction.

Each of first retainer engagement groove 927 and second retainer engagement groove 928 has a depth (i.e., a radial width) greater than a thickness (i.e., a radial width) of each of first holder retainer 941 and second holder retainer 942 of lid 94. Accordingly, in a state in which first holder retainer 941 and second holder retainer 942 respectively engage with first retainer engagement groove 927 and second retainer engagement groove 928, each of first holder retainer 941 and second holder retainer 942 is less in outer diameter than parts of an outer peripheral surface of holder tubular wall 922 which are circumferentially adjacent to a corresponding one of first retainer engagement groove 927 and second retainer engagement groove 928. In other words, in the state in which first holder retainer 941 and second holder retainer 942 respectively engage with first retainer engagement groove 927 and second retainer engagement groove 928, first holder retainer 941 and second holder retainer 942 are retracted radially inwardly with respect to the parts of the outer peripheral surface of holder tubular wall 922 which are circumferentially adjacent to first retainer engagement groove 927 and second retainer engagement groove 928 (see FIG. 22).

First retainer engagement groove 927 and second retainer engagement groove 928 respectively include a first retainer hook engagement groove 927a and a second retainer hook engagement groove 928a in their axial ends adjacent to holder first end 92a. First retainer hook engagement groove 927a and second retainer hook engagement groove 928a extend in the radial direction, and are structured as parts on which a first holder retainer hook 941a and a second holder retainer hook 942a described below are respectively locked. Each of first retainer hook engagement groove 927a and second retainer hook engagement groove 928a is formed as a radially inward convex by cutting the holder first end 92a, in an axial end in holder first end 92a of a corresponding one of first retainer engagement groove 927 and second retainer engagement groove 928.

Figure 22:
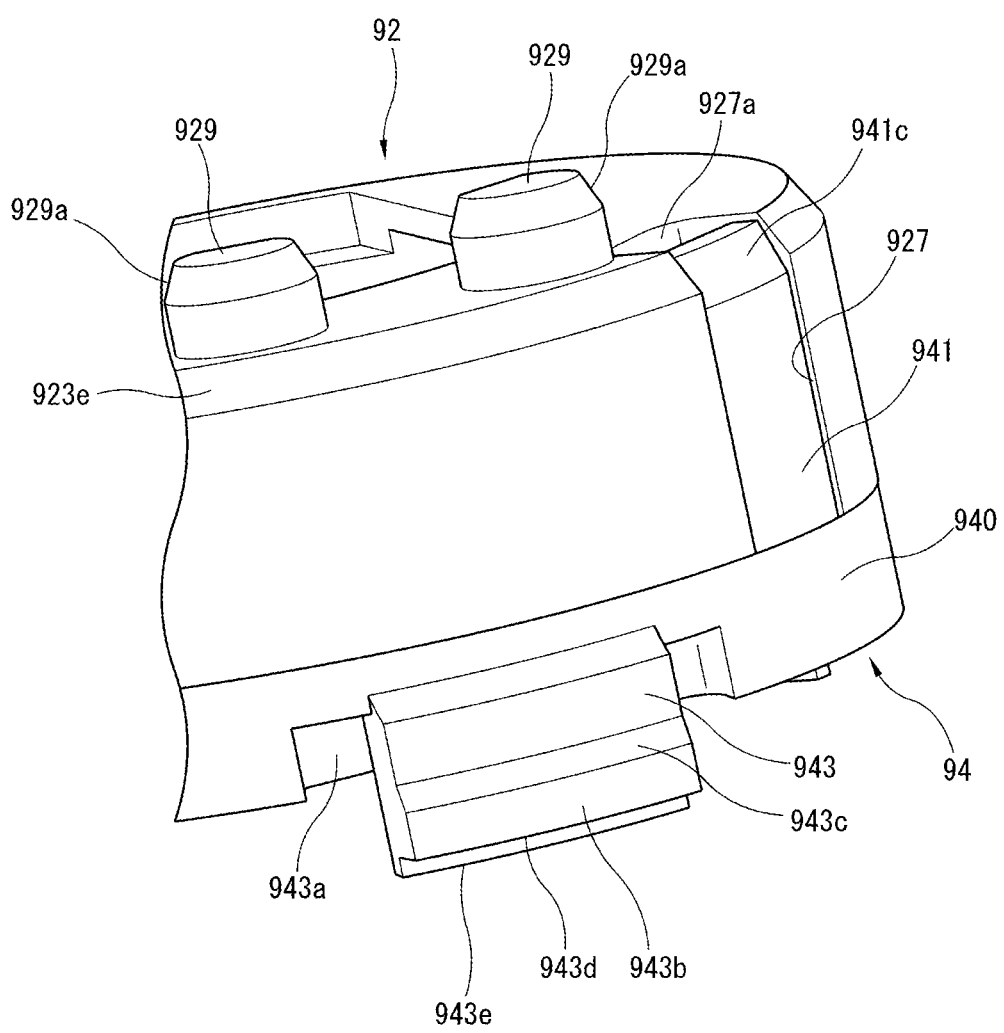
FIG. 22 is an enlarged view of a part of FIG. 5.

As shown in FIGS. 17 and 22, holder bottom 921 of holder 92 includes in its outer side face a pair of holder-positioning projections 929, 929 projecting toward holder first end 92a. As shown in FIG. 18, the pair of holder-positioning projections 929, 929 engage with a holder-positioning-projection engagement groove 127 (described below) formed in center adjuster retainer 122, and thereby restrict circumferential movement of holder 92 in center adjuster retainer 122. Each of the pair of holder-positioning projections 929, 929 has a predetermined gap C2 with a groove bottom of holder-positioning-projection engagement groove 127 in the radial direction. Furthermore, the pair of holder-positioning projections 929, 929 respectively include in their tip, tapered sections 929a, 929a shaped tapered and substantially conical.

As shown in FIGS. 3 and 18, center adjuster retainer 122 includes a holder-positioning contact part 126 that is a flat step formed by decreasing an inner diameter of center adjuster retainer 122 and thereby structured to receive holder first end 92a of holder 92. As shown in FIG. 23, holder-positioning contact part 126 restricts axial movement of holder 92 inside the center adjuster retainer 122, by being in contact with holder first end 92a of holder 92. Holder-positioning contact part 126 includes in its inner peripheral edge the holder-positioning-projection engagement groove 127 extending through the holder-positioning contact part 126 in the axis P direction and engaging with the pair of holder-positioning projections 929, 929. Holder-positioning-projection engagement groove 127 is positioned to determine a circumferential position of holder 92 at a phase at which holder first slide surface 923a and holder second slide surface 923b extend in the gear engagement direction (direction M in FIG. 23).

Holder-positioning-projection engagement groove 127 is a concave groove having a predetermined groove width and extending along a line tangent to the inner peripheral edge of holder-positioning contact part 126 being substantially circular. Holder-positioning-projection engagement groove 127 includes a pair of curved ends in a direction of the groove wherein each of the ends has an inner R-shape (i.e., a concave arc shape). The pair of ends of holder-positioning-projection engagement groove 127 in the direction of the groove are respectively in contact with the pair of holder-positioning projections 929, 929 so as to establish engagement between holder-positioning-projection engagement groove 127 and the pair of holder-positioning projections 929, 929. This restricts circumferential relative rotation of holder 92 with respect to center adjuster retainer 122.

Figure 19:
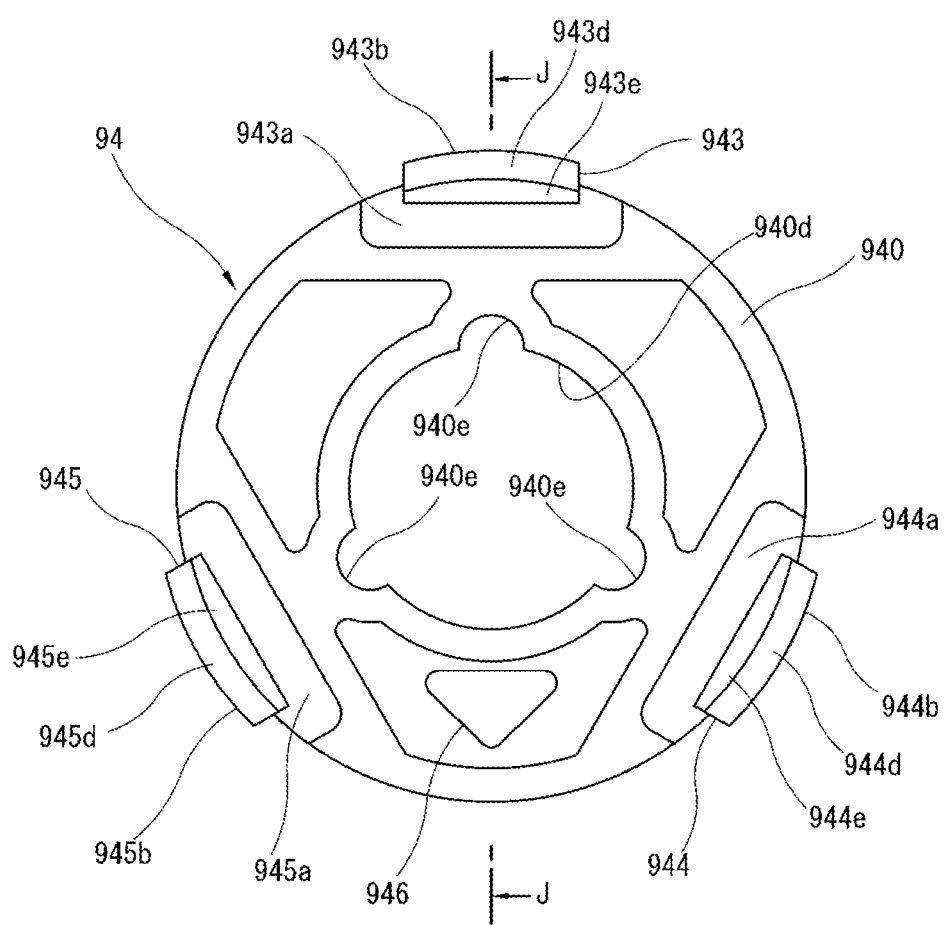
FIG. 19 is a planar view of the lid shown in FIG. 4.
Figure 20:
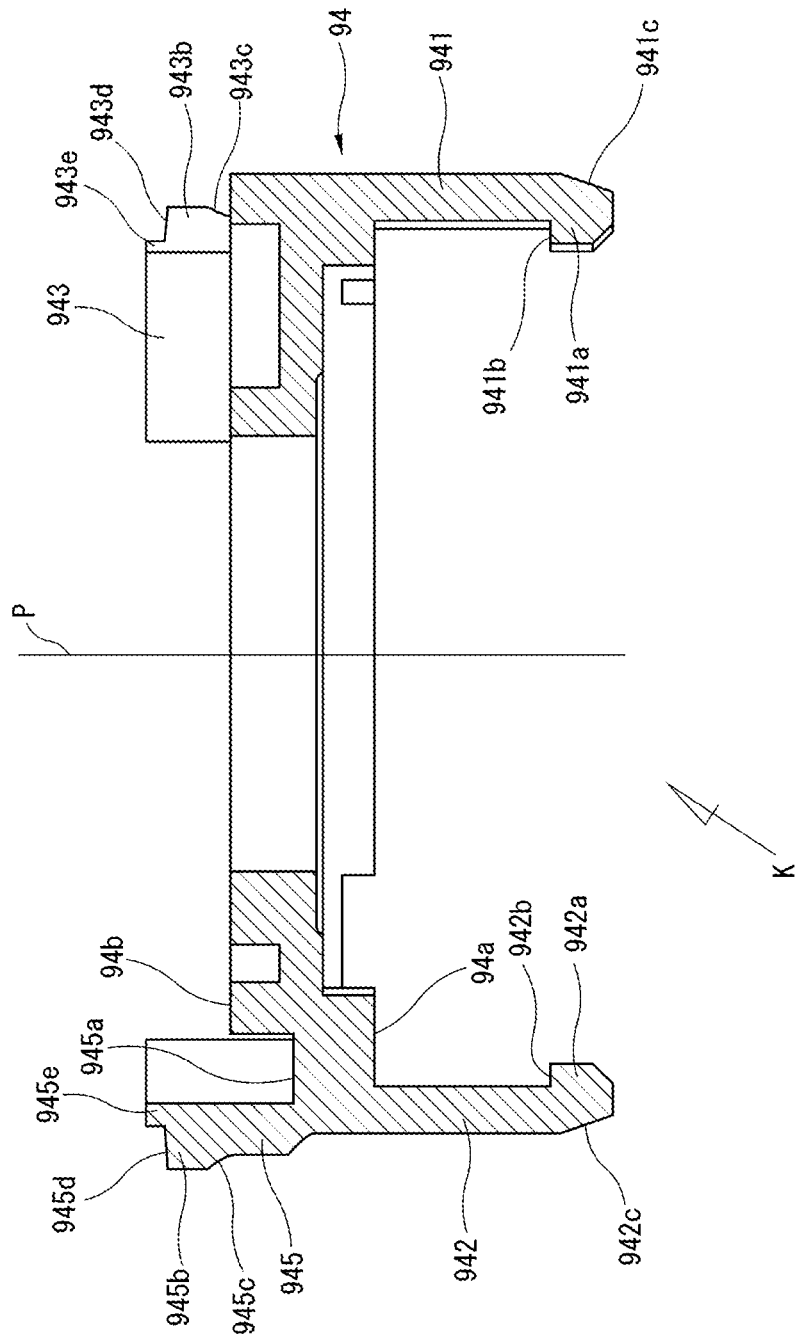
FIG. 20 is a sectional view along a line J-J of FIG. 19.
Figure 21:
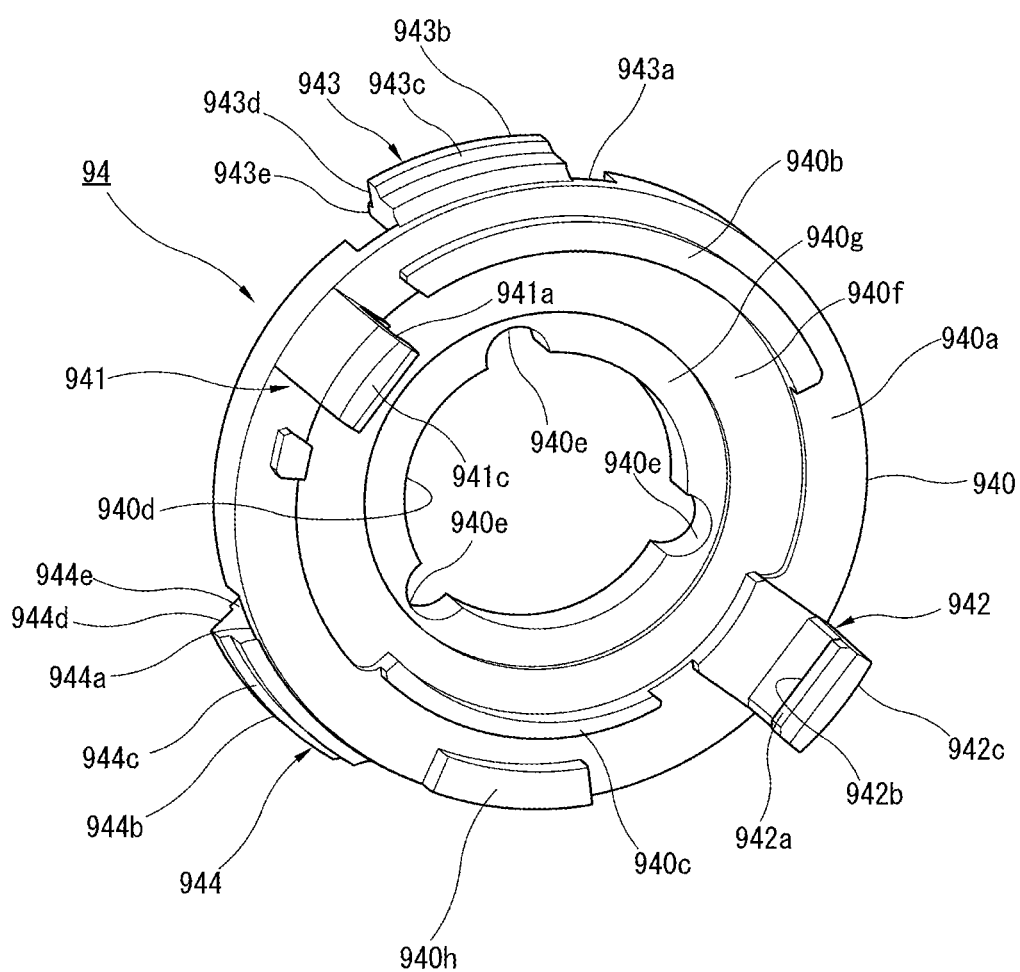
FIG. 21 is a view in a direction of an arrow K of FIG. 20.

FIG. 19 is a planar view of lid 94. FIG. 20 is a sectional view along a line J-J of FIG. 19. FIG. 21 is a view in a direction of an arrow K of FIG. 20. FIG. 22 is an enlarged view of a part of FIG. 5. Lid 94 includes lid body 940 including an inward surface facing holder 92 and an outward surface in the opposite side. For convenience of explanation, the following description refers to the inward surface as a lid first end surface 94a, and refers to the outward surface as a lid second end surface 94b.

As shown in FIGS. 19 to 21 with reference to FIG. 8, lid 94 is made of a resin material smaller in Young's modulus than a material of collar 91 and smaller in Young's modulus than a material of holder 92. Lid 94 includes a lid body 940 having substantially a disk shape, and is structured to close the opening of holder 92 by fitting the lid body 940 in the opening of holder 92. Lid body 940 includes a lid body base 940a and a pair of a first lid body fitting part 940b and a second lid body fitting part 940c. Lid body base 940a is structured to be in contact with an end surface of the opening of holder 92. Each of the pair of first lid body fitting part 940b and second lid body fitting part 940c is shaped to be less in diameter than lid body base 940a so as to form a step with respect to lid body base 940a. The pair of first lid body fitting part 940b and second lid body fitting part 940c are fitted in an inner peripheral surface of the opening of holder 92 to form a so-called spigot joint. In addition, the pair of first lid body fitting part 940b and second lid body fitting part 940c serve also as collar support parts that support the collar second end surface 91b of collar 91.

Lid body 940 has a substantially annular shape, and includes a lid through hole 940d in its central part through which axis P passes. Lid through hole 940d is an axial through hole having a substantially circular shape in planar view. This allows lid body 940 to accept worm second end 612 of worm shaft 61 supported by bearing 8. As shown in FIGS. 19 and 21, lid body 940 further includes a plurality of (e.g., three in the present embodiment) center adjuster rotation grooves 940e in a peripheral edge of lid through hole 940d. Center adjuster rotation grooves 940e are arranged at substantially equal intervals in the circumferential direction. Each of center adjuster rotation grooves 940e has a concave arc shape, and is structured to engage with a jig not shown. This allows adjustment of a circumferential position of center adjuster 90 inside the center adjuster retainer 122, in cooperation with first, second, and third lid bendable grooves 943a, 944a, and 945a as described below.

Lid first end surface 94a of lid body 940 includes a collar second sliding-contact surface 940f in an outer circumferential region with respect to lid through hole 940d. Collar second sliding-contact surface 940f is a substantially flat so as to be in sliding contact with collar second end surface 91b of collar 91 contained inside with respect to lid body 940. In an inner circumferential region with respect to collar second sliding-contact surface 940f, lid first end surface 94a includes a grease retention depression 940g depressed to form a step in a direction away from collar 91 with respect to collar second sliding-contact surface 940f. Grease retention depression 940g retains grease not shown filling an inside of grease retention depression 940g, and serves for lubrication for collar 91.

First lid body fitting part 940b and second lid body fitting part 940c are formed in the inward surface (i.e., lid first end surface 94a) of lid body 940 facing holder 92 so as to face each other across axis P. Each of first lid body fitting part 940b and second lid body fitting part 940c has a substantially arc shape extending in the circumferential direction, and is disposed between first holder retainer 941 and second holder retainer 942 in the circumferential direction as described below. First lid body fitting part 940b is relatively large in radial width, and is longer in circumferential length than second lid body fitting part 940c. Second lid body fitting part 940c is shorter in circumferential length than first lid body fitting part 940b, and is smaller in radial width than first lid body fitting part 940b through the entire length of second lid body fitting part 940c. Furthermore, the radial width of second lid body fitting part 940c within a predetermined region facing second holder retainer 942 in the circumferential direction decreases gradually as approaching a slidable region of collar 91, i.e., as approaching axis Z that crosses the rotational axis P of worm shaft 61 and extends in the gear engagement direction.

As shown in FIGS. 6, 7, and 21, lid first end surface 94a of lid body 940 includes a spring restriction projection 940h structured to restrict axial movement of wire spring 93. Spring restriction projection 940h is formed in a part of lid body 940 in the circumferential direction, and projects toward holder 92 with respect to a part axially adjacent to spring restriction projection 940h. Furthermore, spring restriction projection 940h is formed such that lid body 940 is a predetermined distance apart in the axial direction from a surface of holder first tubular wall 923 facing lid body 940, in a state in which spring restriction projection 940h is in contact with wire spring 93 (see a gap C3 shown in FIG. 7).

As shown in FIGS. 20 and 21, lid first end surface 94a of lid body 940 includes a pair of first holder retainer 941 and second holder retainer 942 that retain holder 92. First holder retainer 941 and second holder retainer 942 extend in the axial direction, and are parallel with each other, and respectively engage with first retainer engagement groove 927 and second retainer engagement groove 928 of holder 92. Each of first holder retainer 941 and second holder retainer 942 has a substantially arc shape cross section, and has the thickness (i.e., the radial width) smaller than the groove depth (i.e., the radial width) of a corresponding one of first retainer engagement groove 927 and second retainer engagement groove 928. In addition, engagement combination between first and second holder retainers 941 and 942 and first and second retainer engagement grooves 927 and 928 is limited to one kind. This serves to suppress incorrect mounting of lid 94 to holder 92.

First holder retainer 941 includes in an inward side of a tip thereof the first holder retainer hook 941a that has a hooklike shape and is locked on first retainer hook engagement groove 927a of holder 92. Similarly, second holder retainer 942 includes in an inward side of a tip thereof the second holder retainer hook 942a that has a hooklike shape and is locked on second retainer hook engagement groove 928a of holder 92. First holder retainer hook 941a and second holder retainer hook 942a respectively include a first-holder-retainer-hook locking surface 941b and a second-holder-retainer-hook locking surface 942b that are inclined with respect to the axial direction and are structured to be in contact with first retainer hook engagement groove 927a and second retainer hook engagement groove 928a respectively. In detail, each of first-holder-retainer-hook locking surface 941b and second-holder-retainer-hook locking surface 942b is inclined to gradually decrease in distance from axis P as approaching a tip of a corresponding one of first holder retainer hook 941a and second holder retainer hook 942a.

First holder retainer hook 941a includes in an outward side of the tip thereof a first holder retainer slope 941c inclined with respect to the axial direction. Similarly, second holder retainer hook 942a includes in an outward side of the tip thereof a second holder retainer slope 942c inclined with respect to the axial direction. Each of first holder retainer slope 941c and second holder retainer slope 942c is inclined to gradually decrease in distance from axis P as approaching a tip of a corresponding one of first holder retainer hook 941a and second holder retainer hook 942a.

As shown in FIGS. 6 and 19, lid second end surface 94b of lid body 940 include the plurality of (e.g., three in the present embodiment) lid engagement parts: i.e., first lid engagement part 943, second lid engagement part 944, and third lid engagement part 945. First lid engagement part 943, second lid engagement part 944, and third lid engagement part 945 are arranged at circumferential positions corresponding to center adjuster rotation grooves 940e, and extend substantially parallel with each other in the axial direction from an outer peripheral edge of lid second end surface 94b of lid body 940, and engage with the inner peripheral surface of center adjuster retainer 122.

First lid engagement part 943, second lid engagement part 944, and third lid engagement part 945 respectively include a first lid bendable groove 943a, a second lid bendable groove 944a, and a third lid bendable groove 945a, in their base ends adjacent to lid body 940. Each of first lid bendable groove 943a, second lid bendable groove 944a, and third lid bendable groove 945a has a shape of a depression being open in the axial direction. This thins connection sections between lid body 940 and first, second, and third lid engagement parts 943, 944, and 945, and facilitates bending deformation of first, second, and third lid engagement parts 943, 944, and 945 in the radial direction.

As shown in FIGS. 3, 6, and 19, first lid engagement part 943, second lid engagement part 944, and third lid engagement part 945 respectively include in their radially outward side the first lid engagement projection 943b, the second lid engagement projection 944b, and the third lid engagement projection 945b that engage with center adjuster locking groove 125 having the annular shape and extending continuously in the circumferential direction in the outer peripheral surface of center adjuster retainer 122. First lid engagement projection 943b, second lid engagement projection 944b, and third lid engagement projection 945b are respectively greater in outer diameter than parts of holder tubular wall 922 adjacent to first retainer engagement groove 927 and second retainer engagement groove 928.

As shown in FIG. 20, first lid engagement projection 943b, second lid engagement projection 944b, and third lid engagement projection 945b respectively include a first thickness gradual-decrease section 943c, a second thickness gradual-decrease section 944c, and a third thickness gradual-decrease section 945c. Each of first thickness gradual-decrease section 943c, second thickness gradual-decrease section 944c, and third thickness gradual-decrease section 945c has a tapered shape, and gradually decreases in radial width (i.e., amount of projection) in a direction toward the base end of a corresponding one of first lid engagement part 943, second lid engagement part 944, and third lid engagement part 945, i.e., in a direction of insertion of center adjuster 90 into center adjuster retainer 122. Furthermore, first lid engagement projection 943b, second lid engagement projection 944b, and third lid engagement projection 945b respectively include in their axially opposite side ends a first lid engagement projection slope 943d, a second lid engagement projection slope 944d, and a third lid engagement projection slope 945d. Each of first lid engagement projection slope 943d, second lid engagement projection slope 944d, and third lid engagement projection slope 945d has a tapered shape, and gradually decreases in radial width (i.e., amount of projection) in a direction toward a tip of a corresponding one of first lid engagement part 943, second lid engagement part 944, and third lid engagement part 945, i.e., in a direction of disengagement of center adjuster 90 from center adjuster retainer 122.

Each of first thickness gradual-decrease section 943c, second thickness gradual-decrease section 944c, and third thickness gradual-decrease section 945c is a gentle slope relatively small in inclination with respect to axis P. On the other hand, each of first lid engagement projection slope 943d, second lid engagement projection slope 944d, and third lid engagement projection slope 945d is a sharp slope relatively large in inclination with respect to axis P, in comparison with first thickness gradual-decrease section 943c, second thickness gradual-decrease section 944c, and third thickness gradual-decrease section 945c.

First lid engagement part 943, second lid engagement part 944, and third lid engagement part 945 respectively include in their tip a first center adjuster detachment projection 943e, a second center adjuster detachment projection 944e, and a third center adjuster detachment projection 945e that project in the axial direction and serve to release engagement between center adjuster locking groove 125 and first, second, and third lid engagement projections 943b, 944b, and 945b. Specifically, the engagement between center adjuster locking groove 125 and first, second, and third lid engagement projections 943b, 944b, and 945b can be released by tilting first, second, and third lid engagement parts 943, 944, and 945 inwardly in the radial direction via first, second, and third center adjuster detachment projections 943e, 944e, and 945e.

Lid second end surface 94b of lid body 940 faces the opening of center adjuster retainer 122 before installation of seal member 95, and includes a marker 946 that allows visual inspection of a direction of sliding of collar 91, i.e., a direction toward the worm wheel. Marker 946 shows a triangle pointing the radially outward direction, and thereby indicates the direction in which collar 91 approaches worm wheel 62.

Thus-configured center adjustment mechanism 9 is installed by inserting center adjuster 90 sub-assembled beforehand into center adjuster retainer 122 of gear housing 12 with holder first end 92a facing center adjuster retainer 122 such that holder-positioning projections 929, 929 meet holder-positioning-projection engagement groove 127. During this insertion, center adjuster 90 becomes in sliding contact with the inner peripheral surface of center adjuster retainer 122, which determines a radial position of center adjuster 90 center adjuster 90 inside the center adjuster retainer 122. After the insertion, pair of holder-positioning projections 929, 929 engage with holder-positioning-projection engagement groove 127, which determines a circumferential position of center adjuster 90 inside the center adjuster retainer 122. Simultaneously, holder first end 92a of center adjuster 90 becomes in contact with holder-positioning contact part 126, which determines an axial position of center adjuster 90 inside the center adjuster retainer 122. Furthermore, first lid engagement projection 943b, second lid engagement projection 944b, and third lid engagement projection 945b engage with center adjuster locking groove 125, which fixes center adjuster 90 to center adjuster retainer 122. In center adjuster 90 that has been installed, first lid engagement projection 943b, second lid engagement projection 944b, and third lid engagement projection 945b are in elastic contact with an end edge of center adjuster locking groove 125 (i.e., an axial end edge facing the opening of center adjuster retainer 122), which generates elastic force to press and fix center adjuster 90 onto holder-positioning contact part 126.

Effects of the Present Embodiment

As described above, the conventional steering device has a problem of changing an action direction of reaction force generated in the worm gear, depending on whether the worm shaft is in positive rotation or negative rotation, especially in case that the worm shaft and the worm wheel are not right-angled in torsion angle therebetween. This may produce a backlash between the worm shaft and the worm wheel upon switching of the worm shaft between positive rotation and negative rotation, and thereby cause a noise due to the backlash.

In view of the foregoing, the steering device according to the present embodiment includes: the steering shaft 2 structured to rotate in response to rotation of the steering wheel; the worm wheel 62 linked to the steering shaft 2; the worm shaft 61 engaging with the worm wheel 62 and including the worm first end 611 and the worm second end 612 as the pair of ends; the electric motor 4 that is structured to supply rotational force to the worm shaft 61 and includes the motor shaft 41 connected to the worm first end 611 of the worm shaft 61; the gear housing 12 including the worm gear container 121 and the center adjuster retainer 122, wherein the worm gear container 121 contains the worm wheel 62 and the worm shaft 61, and wherein the center adjuster retainer 122 surrounds the worm second end 612; the bearing 8 supporting the worm second end 612; the center adjuster 90 that is disposed in the center adjuster retainer 122 and includes the holder 92 and the collar 91, wherein the collar 91 is disposed in the holder 92 and retains the bearing 8 so as to allow the bearing 8 to move relatively with respect to the holder 92 in the gear engagement direction that is the direction of engagement between the worm wheel 62 and the worm shaft 61; and the biasing member (i.e., the wire spring 93) disposed in the center adjuster 90 and structured to bias the bearing 8 in the direction inclined with respect to the gear engagement direction.

As shown in FIG. 23, wire spring 93 biases bearing 8 in the direction (direction N in FIG. 23) inclined with respect to the gear engagement direction (direction M in FIG. 23). This generates a biasing force F exerted in the inclined direction (direction N), wherein biasing force F includes a component force F1 exerted in the gear engagement direction (direction M). Component force F1 moves collar 91, which supports bearing 8, in the gear engagement direction (direction M), and thereby serves to appropriately adjust the engagement between worm shaft 61 and worm wheel 62.

Biasing force F in the inclined direction (direction N) further includes a component force F2 exerted in a direction (i.e., a direction W in FIG. 23) orthogonal to the gear engagement direction. Component force F2 biases collar 91, which supports bearing 8, in the gear engagement orthogonal direction (direction W) orthogonal to the gear engagement direction, and thereby serves to suppress collar 91 from rattling in the gear engagement orthogonal direction (direction W). When representing a reaction force due to positive rotation of worm shaft 61 by reference sign A, and representing a reaction force B due to negative rotation of worm shaft 61 by reference sign B, reaction force A includes a component force A2 that is in a direction opposite to component force F2 and is canceled by component force F2, while reaction force B includes a component force B2 that is in a direction same with component force F2 and is added with component force F2. Thus, component force F2 serves to suppress collar 91 from rattling, and thereby reduce generation of a noise due to the rattling and deterioration in steering feeling.

Furthermore, the present embodiment is configured such that: the holder 92 includes the holder slide surfaces composed of the holder first slide surface 923a and the holder second slide surface 923b that are the pair of surfaces facing each other; the collar 91 is disposed between the holder first slide surface 923a and the holder second slide surface 923b, and retains the bearing 8; the collar 91 includes the collar slide surfaces composed of the collar first slide surface 916a and the collar second slide surface 916b; and the collar first slide surface 916a is in sliding contact with the holder first slide surface 923a, and the collar second slide surface 916b is in sliding contact with the holder second slide surface 923b.

Thus, the collar slide surfaces composed of collar first slide surface 916a and collar second slide surface 916b slide along the holder slide surfaces composed of holder first slide surface 923a and holder second slide surface 923b. This allows collar 91 supporting bearing 8 to move relatively with respect to holder 92 in the gear engagement direction.

Furthermore, the present embodiment is configured such that: the collar 91 includes the collar body 910 and the opening 911; the collar body (910) has the arc shape, and retains the bearing (8) inside the collar body (910); and the bearing (8) includes the outer periphery composed of a first part surrounded by the collar body (910) and a second part facing the opening (911).

Thus, collar 91 includes opening 911 as a part in the circumferential direction. This allows bearing 8 to be mounted to collar 91 via opening 911, and thereby facilitates installation of collar 91 to bearing 8.

Furthermore, the present embodiment is configured such that collar 91 includes collar engagement parts 915 that suppress bearing 8 from dropping off collar body 910.

Thus, collar engagement parts 915 serves to suppress bearing 8 from dropping off after bearing 8 has been mounted to collar body 910.

Furthermore, the present embodiment is configured such that the collar body 910 exerts biasing force toward the center of the bearing 8, on the contact part with the outer periphery of the bearing 8.

Thus, collar body 910 exerts elastic force (i.e., the biasing force) on bearing 8 so as to retain bearing 8, and thereby serves to suppress bearing 8 from dropping off collar body 910.

Furthermore, the present embodiment is configured such that: collar body 910 includes slopes 917 that are respectively disposed in the pair of ends of collar body 910 in the circumferential direction; and slopes 917 are defined such that collar body 910 includes the outer peripheral surface gradually increasing in distance from the holder slide surfaces (i.e., holder first slide surface 923a and holder second slide surface 923b) with decrease in distance from the pair of ends of collar body 910 in the circumferential direction.

Thus, slopes 917 of collar body 910 is inclined such that the outer peripheral surface of collar body 910 gradually goes away from the holder slide surfaces (holder first slide surface 923a and holder second slide surface 923b), as approaching the pair of ends. This suppresses corners of the pair of ends of collar body 910 from interfering with the holder slide surfaces (holder first slide surface 923a and holder second slide surface 923b), and facilitates smooth sliding of collar 91 inside the holder 92.

Furthermore, the present embodiment is configured such that collar body 910 in a natural state before mounting bearing 8 to collar body 910 is smaller in inner diameter than collar body 910 in a state after mounting bearing 8 to collar body 910.

Thus, collar body 910 has an interference with respect to bearing 8. This serves to suppress bearing 8 from dropping off collar body 910.

Furthermore, the present embodiment is configured such that the collar 91 includes the lubrication groove 918 disposed in the end surface of the collar 91 in the direction of the rotational axis P of the worm shaft 61.

Thus, lubrication groove 918 retains lubricant such as the grease described above. This reduces a sliding resistance of collar 91 with respect to holder 92.

Furthermore, the present embodiment is configured such that lubrication groove 918 is connected to the outer peripheral edge of the end surface of collar 91.

This facilitates introduction of lubricant such as the grease retained in an outer peripheral side of collar 91 into lubrication groove 918, and thereby serves to more effectively reduce the sliding resistance of collar 91 with respect to holder 92.

Furthermore, the present embodiment is configured such that: holder 92 includes collar container 920; collar 91 is disposed in collar container 920, and includes collar bottom 913 and collar peripheral wall 914; collar bottom 913 is in contact with one of the pair of end surfaces in the axial direction of bearing 8; collar peripheral wall 914 is continuous with collar bottom 913, and surrounds the outer periphery of bearing 8; and collar peripheral wall 914 includes a first end in an opposite side to collar bottom 913 in the axial direction, wherein the first end of collar peripheral wall 914 gradually decreases in inner diameter, with increase in distance from collar bottom 913.

Thus, collar peripheral wall 914 of collar 91 includes an inner peripheral surface that decreases in inner diameter as going away from collar bottom 913.

This allows collar 91 to have interferences in the axial direction and the radial direction in a state in which bearing 8 is mounted to collar 91. This serves to suppress bearing 8 from rattling in the axial direction and/or the radial direction inside the collar 91.

Furthermore, the present embodiment is configured such that: the biasing member is the spring (the wire spring 93) having the arc shape; the collar 91 includes the spring winding part 914a and the protrusion part 914b; the spring (the wire spring 93) is wound around the spring winding part 914a; and the protrusion part 914b protrudes outwardly in the radial direction in comparison with the spring winding part 914a.

This forms a step between spring winding part 914a and protrusion part 914b, and thereby serves to suppress wire spring 93 from dropping off collar 91.

Furthermore, the present embodiment is configured such that: the spring winding part 914a includes a first end in an opposite side to the protrusion part 914b in the direction of the rotational axis P of the worm shaft 61; and the first end of the spring winding part 914a protrudes outwardly in the radial direction.

Thus, according to the present embodiment, the protruding part of spring winding part 914a and protrusion part 914b of collar 91 are respectively disposed in both side with respect to wire spring 93 in the axial direction. This serves to further suppress wire spring 93 from dropping off collar 91.

Furthermore, the present embodiment is configured such that the spring (the wire spring 93) is wound in a region of the spring winding part 914a wherein the region overlaps with the bearing 8 in the radial direction with respect to the rotational axis P of the worm shaft 61.

This allows wire spring 93 to appropriately exert the biasing force on bearing 8, and serves to effectively suppress collar 91 from rattling.

Furthermore, the present embodiment is configured such that spring winding part 914a has a width in the direction of rotational axis P of worm shaft 61 wherein the width is greater than the radius of the wire of the spring (wire spring 93).

This allows wire spring 93 to be certainly in contact with spring winding part 914a, and serves to obtain an appropriate biasing effect by wire spring 93.

Furthermore, the present embodiment is configured such that the step between spring winding part 914a and protrusion part 914b has a width greater than a diameter of the wire of the spring (wire spring 93).

This serves to suppress wire spring 93 from interfering with other members, and thereby ensure appropriate biasing action by wire spring 93.

Furthermore, the present embodiment is configured such that when viewed from an outer side in the radial direction with respect to rotational axis P of worm shaft 61, holder 92 includes a first section and a second section greater in inner diameter than the first section, wherein the first section is a section in which the holder slide surfaces (i.e., holder first slide surface 923a and holder second slide surface 923b) are formed, while the second section is a section not overlapping with the holder slide surfaces but overlapping with spring winding part 914a.

Thus, according to the present embodiment, the outer peripheral surface of holder 92 in a region facing spring winding part 914a is formed to avoid interference with wire spring 93. This serves to suppress holder 92 from interfering with wire spring 93.

Furthermore, the present embodiment is configured such that: the biasing member is the spring (the wire spring 93) having the arc shape; the collar 91 includes the spring winding part 914a and the protrusion part 914b; the spring (the wire spring 93) is wound around the spring winding part 914a; the protrusion part 914b protrudes outwardly in the radial direction in comparison with the spring winding part 914a; the spring (the wire spring 93) is in contact with the outer periphery of the spring winding part 914a via at least two contact parts; and each of the contact parts is positioned on the virtual circle that has the center shifted from the axis crossing the rotational axis P of the worm shaft 61 and extending in the gear engagement direction (the direction M in FIG. 23).

Thus, according to the present embodiment, center O of virtual circle V passing through the contact parts of spring winding part 914a and wire spring 93 is shifted from axis Z that crosses rotational axis P of worm shaft 61 and extends in the gear engagement direction (direction M in FIG. 23). This allows wire spring 93 to bias bearing 8 in the direction (direction N in FIG. 23) inclined with respect to the gear engagement direction.

Furthermore, the present embodiment is configured such that: the holder 92 includes the spring locking part 925 on which the spring (the wire spring 93) is locked; the spring locking part 925 is disposed in an opposite side to the contact parts between the spring (the wire spring 93) and the spring winding part 914a, across the rotational axis P of the worm shaft 61.

Thus, according to the present embodiment, spring locking part 925 is disposed in the opposite side to the contact parts between spring winding part 914a and wire spring 93, across rotational axis P of worm shaft 61. This allows bearing 8 to be biased in the direction (direction N in FIG. 23) inclined with respect to the gear engagement direction.

Furthermore, the present embodiment is configured such that: the biasing member is the spring (wire spring 93) having the arc shape; and holder 92 includes spring rotation restricter 926 that is in contact with the pair of ends of the spring (wire spring 93).

Thus, according to the present embodiment, the pair of circumferential ends of wire spring 93 interpose spring rotation restricter 926 of holder 92 therebetween. This allows spring rotation restricter 926 to restrict rotation of wire spring 93.

Furthermore, the present embodiment is configured such that: the center adjuster 90 includes the lid 94; the collar 91 of the center adjuster 90 includes the collar first end surface 91a and the collar second end surface 91b that are the pair of end surfaces in the axial direction; the holder 92 of the center adjuster 90 includes the holder bottom 921 and the holder tubular wall 922; the holder bottom 921 is in contact with the collar first end surface 91a; the holder tubular wall 922 is continuous with the holder bottom 921, and surrounds the outer periphery of the collar 91; the holder tubular wall 922 includes an end in an opposite side to the holder bottom 921 in the axial direction wherein the end of the holder tubular wall 922 is adjacent to the lid 94 of the center adjuster 90; and the lid 94 is in contact with the collar second end surface 91b.

Thus, according to the present embodiment, holder 92 and lid 94 interpose collar 91 from both sides in the axial direction. This serves to ensure smooth sliding action of collar 91.

Furthermore, the present embodiment is configured such that: lid 94 includes the collar sliding-contact surface (i.e., collar second sliding-contact surface 940f) and grease retention depression 940*g*; the collar sliding-contact surface (collar second sliding-contact surface 940*f*) is disposed in a region in contact with collar second end surface 91*b*; and grease retention depression 940*g* is positioned inner with respect to the collar sliding-contact surface (collar second sliding-contact surface 940*f*), and is depressed to be apart from collar 91 in the direction of rotational axis P of worm shaft 61.

This allows grease retention depression 940*g* to retain grease therein, and supply the grease to collar second sliding-contact surface 940*f*. This serves to reduce a sliding resistance between collar 91 and lid 94.

Furthermore, the present embodiment is configured such that: the center adjuster retainer 122 of the gear housing 12 has the tubular shape defining the center adjuster container space inside the center adjuster retainer 122, and includes the inner periphery including the center adjuster locking groove 125 shaped annular; and the lid 94 of the center adjuster 90 includes the lid engagement projections (i.e., the first, second, and third first lid engagement projections 943*b*, 944*b*, and 945*b*) engaging with the center adjuster locking groove 125.

Thus, first, second, and third first lid engagement projections 943*b*, 944*b*, and 945*b* engage with center adjuster locking groove 125. This serves to suppress center adjuster 90 from dropping off center adjuster retainer 122.

Furthermore, the present embodiment is configured such that: lid 94 is made of a resin material, and includes lid body 940 including the lid engagement parts (first, second, and third lid engagement parts 943, 944, and 945) and the lid bendable grooves (first, second, and third lid bendable grooves 943*a*, 944*a*, and 945*a*) and the lid engagement projections (first, second, and third lid engagement projections 943*b*, 944*b*, and 945*b*); the lid engagement parts (first, second, and third lid engagement parts 943, 944, and 945) project from lid body 940 in the direction away from holder 92 in the direction of rotational axis P of worm shaft 61; the lid engagement projections (first, second, and third lid engagement projections 943*b*, 944*b*, and 945*b*) project outwardly in the radial direction from the lid engagement parts (first, second, and third lid engagement parts 943, 944, and 945); and the lid bendable grooves (first, second, and third lid bendable grooves 943*a*, 944*a*, and 945*a*) are disposed between lid body 940 and the lid engagement parts (first, second, and third lid engagement parts 943, 944, and 945) in the radial direction with respect to rotational axis P of worm shaft 61, so as to open in the direction of rotational axis P of worm shaft 61.

Thus, according to the present embodiment, first, second, and third lid bendable grooves 943*a*, 944*a*, and 945*a* are formed in lid 94, and thereby facilitate bending deformation of first, second, and third lid engagement parts 943, 944, and 945. This facilitates mounting of center adjuster 90 to center adjuster retainer 122, and serves to improve the steering device in productivity.

Furthermore, the present embodiment is configured such that: lid 94 includes center adjuster rotation grooves 940*e*; and adjuster rotation grooves 940*e* are disposed in the inner periphery of lid through hole 940*d* formed inner with respect to the lid bendable grooves (first, second, and third lid bendable grooves 943*a*, 944*a*, and 945*a*), and are depressed outwardly in the radial direction with respect to rotational axis P of worm shaft 61.

Thus, according to the present embodiment, the rotational position of center adjuster 90 can be adjusted even after inserting center adjuster 90 into center adjuster retainer 122, by fitting a jig to both of first, second, and third lid bendable grooves 943*a*, 944*a*, and 945*a* and center adjuster rotation groove 940*e* and thereby rotating lid 94. This facilitates installation of center adjuster 90.

Furthermore, the present embodiment is configured such that: the lid engagement parts (first, second, and third lid engagement parts 943, 944, and 945) of lid 94 respectively include the center adjuster detachment projections (i.e., first, second and third center adjuster detachment projections 943*e*, 944*e*, and 945*e*); and the center adjuster detachment projections (first, second, and third center adjuster detachment projections 943*e*, 944*e*, and 945*e*) respectively project from the tips of the lid engagement parts (first, second, and third lid engagement parts 943, 944, and 945) in the direction of rotational axis P of worm shaft 61.

Thus, according to the present embodiment, first, second, and third lid engagement parts 943, 944, and 945 can be bendable inwardly in the radial direction via first, second, and third lid bendable grooves 943*a*, 944*a*, and 945*a*, by pinching first, second, and third center adjuster detachment projections 943*e*, 944*e*, and 945*e* with a tool not shown. This allows first, second, and third lid engagement projections 943*b*, 944*b*, and 945*b* to be separated from center adjuster locking groove 125, and allows center adjuster 90 to be detached from center adjuster retainer 122. This facilitates detachment of center adjuster 90.

Furthermore, the present embodiment is configured such that: the lid engagement parts (first, second, and third lid engagement parts 943, 944, and 945) of lid 94 respectively include the thickness gradual-decrease sections (i.e., first, second, and third thickness gradual-decrease sections 943*c*, 944*c*, and 945*c*); and the thickness gradual-decrease sections (first, second, and third thickness gradual-decrease sections 943*c*, 944*c*, and 945*c*) are respectively disposed between the lid engagement projections (first, second, and third lid engagement projections 943*b*, 944*b*, and 945*b*) and lid body 940, and respectively increase in cross sectional area perpendicular to rotational axis P of worm shaft 61, as approaching from lid body 940 to the lid engagement projections (first, second, and third lid engagement projections 943*b*, 944*b*, and 945*b*) in the direction of rotational axis P of worm shaft 61.

Thus, according to the present embodiment, the thickness gradual-decrease sections (first, second, and third thickness gradual-decrease sections 943*c*, 944*c*, and 945*c*) of the lid engagement parts (first, second, and third lid engagement parts 943, 944, and 945) are shaped to gradually vary in thickness. This serves to suppress concentration of internal stress upon bending deformation of first, second, and third lid engagement parts 943, 944, and 945.

Furthermore, the present embodiment is configured such that: center adjuster locking groove 125 includes a first surface structured to be in contact with the lid engagement projections (first, second, and third lid engagement projections 943*b*, 944*b*, and 945*b*) wherein the first surface is perpendicular to rotational axis P of worm shaft 61; and each of the lid engagement projections (first, second, and third lid engagement projections 943*b*, 944*b*, and 945*b*) includes a surface structured to be in contact with center adjuster locking groove 125 and inclined with respect to axis P of worm shaft 61.

This facilitates engagement of the inclined surfaces of first, second, and third lid engagement projections 943*b*, 944*b*, and 945*b* with center adjuster locking groove 125, and thereby serves to suppress center adjuster 90 from rattling inside the center adjuster locking groove 125.

Furthermore, the present embodiment is configured such that: the biasing member is the spring (wire spring 93)

having the arc shape; lid 94 includes lid body 940 including spring restriction projection 940h; spring restriction projection 940h is disposed in a part of lid body 940 in the circumferential direction around rotational axis P of worm shaft 61; spring restriction projection 940h is formed such that lid body 940 is a predetermined distance apart in the direction of rotational axis P of worm shaft 61, from a surface of holder tubular wall 922 (in detail, holder first tubular wall 923) facing lid body 940; and spring restriction projection 940h projects toward holder 92 with respect to a part adjacent to spring restriction projection 940h in the direction of rotational axis P of worm shaft 61.

Thus, according to the present embodiment, wire spring 93 is interposed between spring restriction projection 940h and holder tubular wall 922, while spring restriction projection 940h projects toward holder tubular wall 922 with respect to the part adjacent to spring restriction projection 940h. This serves to narrow a distance between spring restriction projection 940h and holder tubular wall 922, and thereby restrict free movement of wire spring 93 in the axial direction.

Furthermore, the present embodiment is configured such that: holder 92 includes the retainer hook engagement grooves (i.e., first and second retainer hook engagement grooves 927a and 928a); the retainer hook engagement grooves (first and second retainer hook engagement grooves 927a and 928a) respectively include the surfaces being perpendicular to rotational axis P of worm shaft 61 and being in contact with the holder retainer hooks (i.e., first and second holder retainer hooks 941a and 942a); lid 94 includes lid body 940 and the holder retainers (i.e., first and second holder retainers 941 and 942) retaining holder 92; the holder retainers (first and second holder retainers 941 and 942) project from lid body 940 toward holder 92 in the direction of rotational axis P of worm shaft 61; the holder retainers (first and second holder retainers 941 and 942) respectively include the holder retainer hooks (first and second holder retainer hooks 941a and 942a); and the holder retainer hooks (first and second holder retainer hook 941a and 942a) are respectively disposed in the tips of the holder retainers (first and second holder retainers 941 and 942), and respectively include the surfaces inclined with respect to rotational axis P of worm shaft 61 and structured to be in contact with the retainer hook engagement grooves (first and second retainer hook engagement grooves 927a and 928a).

This facilitates establishment of contact between first and second retainer hook engagement grooves 927a and 928a and the inclined surfaces of first and second holder retainer hooks 941a and 942a. Holder 92 and lid 94 assembled serve to suppress collar 91 from rattling.

Furthermore, the present embodiment is configured such that: holder 92 includes the retainer hook engagement grooves (first and second retainer hook engagement grooves 927a and 928a); lid 94 includes lid body 940 and the holder retainers (first and second holder retainers 941 and 942) retaining holder 92; the holder retainers (first and second holder retainers 941 and 942) project from lid body 940 toward holder 92 in the direction of rotational axis P of worm shaft 61; the holder retainers (first and second holder retainers 941 and 942) respectively include the holder retainer hooks (first and second holder retainer hooks 941a and 942a) and the holder retainer slopes (first and second holder retainer slopes 941c and 942c); the holder retainer hooks (first and second holder retainer hooks 941a and 942a) are respectively disposed in the inward surfaces of the tips of the holder retainers (first and second holder retainers 941 and 942) in the radial direction with respect to rotational axis P of worm shaft 61; and the holder retainer slopes (first and second holder retainer slopes 941c and 942c) are respectively disposed in the outward surfaces of the tips of the holder retainers (first holder retainer 941 and second holder retainer 942) in the radial direction with respect to rotational axis P of worm shaft 61, and are inclined with respect to rotational axis P of worm shaft 61.

In case of failing to appropriately fit first and second holder retainer hooks 941a and 942a into first and second retainer hook engagement grooves 927a and 928a, the tips of first and second holder retainers 941 and 942 may project outside in the radial direction. However, according to the present embodiment, first and second holder retainer hooks 941a and 942a respectively include first and second holder retainer slopes 941c and 942c. This serves to suppress the tips of first and second holder retainers 941 and 942 from interfering with the inner peripheral surface of center adjuster retainer 122, even in case of somewhat insufficient engagement between first and second holder retainer hooks 941a and 942a and first and second retainer hook engagement grooves 927a and 928a.

Furthermore, the present embodiment is configured such that: holder 92 includes the retainer engagement grooves (i.e., first and second retainer engagement grooves 927 and 928); the retainer engagement grooves (first and second retainer engagement grooves 927 and 928) are respectively shaped groovy to extend in the direction of rotational axis P of worm shaft 61, and are disposed in the outer periphery of holder tubular wall 922; lid 94 includes lid body 940 and the holder retainers (first and second holder retainers 941 and 942) retaining holder 92; the holder retainers (first and second holder retainers 941 and 942) project from lid body 940 toward holder 92 in the direction of rotational axis P of worm shaft 61, and engage with the retainer engagement grooves (first and second retainer engagement grooves 927 and 928); and the holder retainers (first and second holder retainers 941 and 942) in engagement with the retainer engagement grooves (first and second retainer engagement grooves 927 and 928) are respectively less in outer diameter than parts of holder tubular wall 922 adjacent to the retainer engagement grooves (first and second retainer engagement grooves 927 and 928).

Thus, according to the present embodiment, the outer peripheral surface of each of the holder retainers (first and second holder retainers 941 and 942) when being in engagement with the retainer engagement grooves (first and second retainer engagement grooves 927 and 928) is retracted with respect to the outer peripheral surface of holder tubular wall 922. This serves to suppress first and second holder retainers 941 and 942 from interfering with the inner peripheral surface of center adjuster retainer 122 in a state in which center adjuster 90 has been mounted to center adjuster retainer 122, and thereby suppress first and second holder retainers 941 and 942 from affecting a process of bringing holder tubular wall 922 into contact with the inner peripheral surface of center adjuster retainer 122 and performing positioning of center adjuster 90.

Furthermore, the present embodiment is configured such that: center adjuster retainer 122 has the tubular shape defining the center adjuster container space inside the center adjuster retainer 122, and includes the inner periphery including center adjuster locking groove 125 shaped annular; lid 94 is made of a resin material, and includes lid body 940 including the lid engagement parts (first, second, and third lid engagement parts 943, 944, and 945); the lid engagement parts (first, second, and third lid engagement parts 943, 944, and 945) project from lid body 940 in the direction away from holder 92 in the direction of rotational axis P of worm shaft 61, and respectively include the lid engagement projections (first, second, and third lid engagement projections 943*b*, 944*b*, and 945*b*) in the tips of the lid engagement parts (first, second, and third lid engagement parts 943, 944, and 945); and the lid engagement projections (first, second, and third lid engagement projections 943*b*, 944*b*, and 945*b*) project outwardly in the radial direction with respect to rotational axis P of worm shaft 61, from the lid engagement parts (first, second, and third lid engagement parts 943, 944, and 945), and engage with center adjuster locking groove 125, and are respectively greater in outer diameter in the radial direction than parts of holder tubular wall 922 adjacent to the retainer engagement grooves (first and second retainer engagement grooves 927 and 928).

According to the present embodiment, center adjuster 90 is inserted into center adjuster retainer 122 with holder 92 directed forward and with lid 94 directed backward. On this occasion, first, second, and third lid engagement projections 943*b*, 944*b*, and 945*b* project outwardly in the radial direction in comparison with the outer peripheral surface of holder tubular wall 922. This facilitates establishment of sufficient engagement between first, second, and third lid engagement projections 943*b*, 944*b*, and 945*b* and center adjuster locking groove 125.

Furthermore, the present embodiment is configured such that lid 94 includes marker 946 that allows the rotational position of lid 94 around rotational axis P of worm shaft 61 to be visually inspected from an outside of gear housing 12.

Thus, according to the present embodiment, the rotational position of center adjuster 90 can be checked from the outside of gear housing 12, upon inserting center adjuster 90 into center adjuster retainer 122. This facilitates the insertion of center adjuster 90 into center adjuster retainer 122.

Furthermore, the present embodiment is configured such that lid 94 is allowed to engage with holder 92, at only one rotational position with respect to holder 92 in the circumferential direction around rotational axis P of worm shaft 61.

Thus, according to the present embodiment, holder 92 and lid 94 accord in rotational position, at the only one rotational position. Accordingly, the rotational position of holder 92 can be checked by checking the rotational position of lid 94 with marker 946. This facilitates the insertion of center adjuster 90 into center adjuster retainer 122.

Furthermore, the present embodiment is configured such that collar 91 is made of a material less in friction coefficient than a material of holder 92 and a material of lid 94.

Thus, according to the present embodiment, collar 91 is small in friction coefficient sufficiently to smoothly slide with respect to both of holder 92 and lid 94.

Furthermore, the present embodiment is configured such that lid 94 is made of a material less in Young's modulus than a material of holder 92 and a material of collar 91.

Thus, according to the present embodiment, first and second holder retainers 941 and 942 and first, second, and third lid engagement parts 943, 944, and 945 of lid 94 are easily bendable. This facilitates the mounting of lid 94 to holder 92 and the inserting of center adjuster 90 into center adjuster retainer 122.

Furthermore, the present embodiment is configured such that: lid 94 includes the collar supporters (i.e., first and second lid body fitting parts 940*b* and 940*c*) supporting the outer peripheral surface of collar 91; and the collar supporters (first and second lid body fitting parts 940*b* and 940*c*) project toward holder 92 in the direction of rotational axis P of worm shaft 61, and respectively decrease in thickness in the radial direction with respect to rotational axis P of worm shaft 61, as approaching the axis crossing rotational axis P of worm shaft 61 and extending in the gear engagement direction (direction M in FIG. 23).

Thus, according to the present embodiment, each of first and second lid body fitting parts 940*b* and 940*c* serving as the collar supporters is thinned as going in the sliding direction of collar 91. This serves to suppress first and second lid body fitting parts 940*b* and 940*c* from interfering with collar 91 in case that collar 91 slides in a direction to deepen the engagement of the worm gear. On the other hand, by thickening first and second lid body fitting parts 940*b* and 940*c* as going in a direction orthogonal to the sliding direction of collar 91, first and second lid body fitting parts 940*b* and 940*c* can be improved in rigidity, and also lid 94 can be improved in rigidity.

Furthermore, the present embodiment is configured such that: the center adjuster retainer 122 of the gear housing 12 has the tubular shape defining the center adjuster container space inside the center adjuster retainer 122; the center adjuster container space has a circular shape at a cross section perpendicular to the rotational axis P of the worm shaft 61; the center adjuster 90 has a circular outline at a cross section perpendicular to the rotational axis P of the worm shaft 61; the center adjuster 90 includes the outer peripheral surface that is in contact with the inner peripheral surface of the center adjuster retainer 122; and the center adjuster 90 and the center adjuster retainer 122 are structured to determine the position of the center adjuster 90 with respect to the center adjuster retainer 122, due to the contact between the outer peripheral surface of the center adjuster 90 and the inner peripheral surface of the center adjuster retainer 122.

Thus, according to the present embodiment, the inner peripheral surface of center adjuster retainer 122 is shaped tubular. This facilitates machining of gear housing 12. In addition, the inner peripheral surface of center adjuster retainer 122 and the outer peripheral surface of center adjuster 90 are both circular. This facilitates axis alignment of center adjuster retainer 122 and center adjuster 90.

Furthermore, the present embodiment is configured such that: holder 92 includes holder bottom 921, holder tubular wall 922, and holder-positioning projections 929, 929; holder-positioning projections 929, 929 project from holder tubular wall 922 in the direction away from collar 91, in the direction of rotational axis P of worm shaft 61; center adjuster retainer 122 includes holder-positioning-projection engagement groove 127; holder-positioning-projection engagement groove 127 engages with holder-positioning projections 929, 929, and thereby restricts relative rotation of holder 92 with respect to center adjuster retainer 122 in a rotational direction around rotational axis P of worm shaft 61.

Thus, according to the present embodiment, holder 92 includes holder-positioning projections 929, 929 engaging with holder-positioning-projection engagement groove 127 disposed in center adjuster retainer 122. This serves to determine the position in the circumferential direction of holder 92 inside the center adjuster retainer 122, and thereby obtain the appropriate biasing effect by wire spring 93 (i.e., the biasing action of wire spring 93 biasing bearing 8 in the direction inclined with respect to the gear engagement direction).

Furthermore, the present embodiment is configured such that: holder-positioning-projection engagement groove 127 is the groove that is formed in the inner periphery of center adjuster retainer 122 and is open in the direction of rotational axis P of worm shaft 61; and each of holder-positioning projections 929, 929 has the gap C2 with holder-positioning-projection engagement groove 127 in the radial direction with respect to rotational axis P of worm shaft 61.

This prevents holder-positioning-projection engagement groove 127 from exerting reaction force in the radial direction on holder-positioning projections 929, 929, and thereby suppress holder-positioning projections 929, 929 from affecting axis aligning of holder 92, inside the center adjuster retainer 122.

Furthermore, the present embodiment is configured such that holder-positioning projections 929, 929 respectively include in their tips the tapered sections 929a, 929a inclined to be tapered.

Thus, holder-positioning projections 929, 929 respectively include in their tips the tapered sections 929a, 929a inclined to be tapered. This facilitates insertion of holder-positioning projections 929, 929 into holder-positioning-projection engagement groove 127, and thereby facilitates the mounting of center adjuster 90 to center adjuster retainer 122.

Furthermore, the present embodiment is configured such that: holder 92 includes holder bottom 921 and holder tubular wall 922; and center adjuster retainer 122 includes holder-positioning contact part 126 that is in contact with holder bottom 921 in the direction of rotational axis P of worm shaft 61 and thereby perform the positioning of holder 92 in the direction of rotational axis P of worm shaft 61 with respect to center adjuster retainer 122.

Thus, according to the present embodiment, center adjuster retainer 122 includes holder-positioning contact part 126. This allows holder-positioning contact part 126 to determine the position in the axial direction of holder 92, and thereby serves for appropriate positioning of center adjuster 90 with respect to center adjuster retainer 122.

The present invention is not limited to configurations and aspects exemplified in the present embodiment, but may be freely modified depending on specifications, costs, etc. of application targets, as long as presenting the effects of the present invention described above.

The following describes exemplary aspects of a steering device according to the embodiment above.

According to one aspect, the steering device includes: a steering shaft structured to rotate in response to rotation of a steering wheel; a worm wheel linked to the steering shaft; a worm shaft engaging with the worm wheel and including a worm first end and a worm second end as a pair of ends; an electric motor that is structured to supply rotational force to the worm shaft and includes a motor shaft connected to the worm first end of the worm shaft; a gear housing including a worm gear container and a center adjuster retainer, wherein the worm gear container contains the worm wheel and the worm shaft, and wherein the center adjuster retainer surrounds the worm second end; a bearing supporting the worm second end; a center adjuster that is disposed in the center adjuster retainer and includes a holder and a collar, wherein the collar is disposed in the holder and retains the bearing so as to allow the bearing to move relatively with respect to the holder in a gear engagement direction that is a direction of engagement between the worm wheel and the worm shaft; and a biasing member disposed in the center adjuster and structured to bias the bearing in a direction inclined with respect to the gear engagement direction.

In addition to the favorable aspect above, the steering device is configured such that: the holder includes holder slide surfaces composed of a holder first slide surface and a holder second slide surface that are a pair of surfaces facing each other; the collar is disposed between the holder first slide surface and the holder second slide surface, and retains the bearing; the collar includes collar slide surfaces composed of a collar first slide surface and a collar second slide surface; and the collar first slide surface is in sliding contact with the holder first slide surface, and the collar second slide surface is in sliding contact with the holder second slide surface.

According to another aspect, in addition to any one of the above aspects, the steering device is configured such that: the collar includes a collar body and an opening; the collar body has an arc shape, and retains the bearing inside the collar body; and the bearing includes an outer periphery composed of a first part surrounded by the collar body and a second part facing the opening.

According to still another aspect, in addition to any one of the above aspects, the steering device is configured such that the collar includes a collar engagement part structured to suppress the bearing from dropping off the collar body.

According to still another aspect, in addition to any one of the above aspects, the steering device is configured such that the collar body exerts biasing force toward a center of the bearing, on a contact part with the outer periphery of the bearing.

According to still another aspect, in addition to any one of the above aspects, the steering device is configured such that: the collar body includes a pair of ends in a circumferential direction each of which includes a slope; and the slopes are defined such that the collar body includes an outer peripheral surface gradually increasing in distance from the holder slide surfaces with decrease in distance from the pair of ends of the collar body.

According to still another aspect, in addition to any one of the above aspects, the steering device is configured such that the collar body in a natural state before mounting the bearing to the collar body is smaller in inner diameter than the collar body in a state after mounting the bearing to the collar body.

According to still another aspect, in addition to any one of the above aspects, the steering device is configured such that the collar includes a lubrication groove disposed in an end surface of the collar in a direction of a rotational axis of the worm shaft.

According to still another aspect, in addition to any one of the above aspects, the steering device is configured such that the lubrication groove is connected to an outer peripheral edge of the end surface of the collar.

According to still another aspect, in addition to any one of the above aspects, the steering device is configured such that: the holder includes a collar container; the collar is disposed in the collar container, and includes a collar bottom and a collar peripheral wall; the collar bottom is in contact with one of a pair of end surfaces in the axial direction of the bearing; the collar peripheral wall is continuous with the collar bottom, and surrounds the outer periphery of bearing 8; and the collar peripheral wall includes a first end in an opposite side to the collar bottom in the axial direction, wherein the first end of the collar peripheral wall gradually decreases in inner diameter, with increase in distance from the collar bottom.

According to still another aspect, in addition to any one of the above aspects, the steering device is configured such that: the biasing member is a spring having an arc shape; the collar includes a spring winding part and a protrusion part; the spring is wound around the spring winding part; and the protrusion part protrudes outwardly in a radial direction in comparison with the spring winding part.

According to still another aspect, in addition to any one of the above aspects, the steering device is configured such that: the spring winding part includes a first end in an opposite side to the protrusion part in the direction of the rotational axis of the worm shaft; and the first end of the spring winding part protrudes outwardly in the radial direction.

According to still another aspect, in addition to any one of the above aspects, the steering device is configured such that: the spring is wound in a region of the spring winding part wherein the region overlaps with the bearing in the radial direction with respect to the rotational axis of the worm shaft.

According to still another aspect, in addition to any one of the above aspects, the steering device is configured such that the spring winding part has a width in the direction of rotational axis P of worm shaft 61 wherein the width is greater than a radius of a wire of the spring.

According to still another aspect, in addition to any one of the above aspects, the steering device is configured such that the spring winding part and the protrusion part forms therebetween a step having a width greater than a diameter of the wire of the spring.

According to still another aspect, in addition to any one of the above aspects, the steering device is configured such that when viewed from an outer side in the radial direction with respect to the rotational axis of the worm shaft, the holder includes a first section and a second section greater in inner diameter than the first section, wherein the first section is a section in which the holder slide surfaces are formed, while the second section is a section not overlapping with the holder slide surfaces but overlapping with the spring winding part.

According to still another aspect, in addition to any one of the above aspects, the steering device is configured such that: the biasing member is the spring having the arc shape; the collar includes the spring winding part and the protrusion part; the spring is wound around the spring winding part; the protrusion part protrudes outwardly in the radial direction in comparison with the spring winding part; the spring is in contact with an outer periphery of the spring winding part via at least two contact parts; and each of the contact parts is positioned on a virtual circle that has a center shifted from an axis crossing a the rotational axis of the worm shaft and extending in the gear engagement direction.

According to still another aspect, in addition to any one of the above aspects, the steering device is configured such that: the holder includes a spring locking part on which the spring is locked; the spring locking part is disposed in an opposite side to the contact parts between the spring and the spring winding part, across the rotational axis of the worm shaft.

According to still another aspect, in addition to any one of the above aspects, the steering device is configured such that: the biasing member is the spring having the arc shape; and the holder includes a spring rotation restricter that is in contact with a pair of ends of the spring.

According to still another aspect, in addition to any one of the above aspects, the steering device is configured such that: the center adjuster includes a lid; the collar of the center adjuster includes a collar first end surface and a collar second end surface that are a pair of end surfaces in the axial direction; the holder of the center adjuster includes a holder bottom and a holder tubular wall; the holder bottom is in contact with the collar first end surface; the holder tubular wall is continuous with the holder bottom, and surrounds an outer periphery of the collar; the holder tubular wall includes an end in an opposite side to the holder bottom in the axial direction wherein the end of the holder tubular wall is adjacent to the lid of the center adjuster; and the lid is in contact with the collar second end surface.

According to still another aspect, in addition to any one of the above aspects, the steering device is configured such that: the lid includes a collar sliding-contact surface and a grease retention depression; the collar sliding-contact surface is disposed in a region in contact with the collar second end surface; and the grease retention depression is positioned inner with respect to the collar sliding-contact surface, and is depressed to be apart from the collar in the direction of the rotational axis of the worm shaft.

According to still another aspect, in addition to any one of the above aspects, the steering device is configured such that: the center adjuster retainer of the gear housing has a tubular shape defining a center adjuster container space inside the center adjuster retainer, and includes an inner periphery including a center adjuster locking groove shaped annular; and the lid of the center adjuster includes a lid engagement projection engaging with the center adjuster locking groove.

According to still another aspect, in addition to any one of the above aspects, the steering device is configured such that: the lid is made of a resin material, and includes a lid body including a lid engagement part and a lid bendable groove and a lid engagement projection; the lid engagement part projects from the lid body in a direction away from the holder in the direction of the rotational axis of the worm shaft; the lid engagement projection projects outwardly in the radial direction from the lid engagement part; and the lid bendable groove is disposed between the lid body and the lid engagement part in the radial direction with respect to the rotational axis of the worm shaft, so as to open in the direction of the rotational axis of the worm shaft.

According to still another aspect, in addition to any one of the above aspects, the steering device is configured such that: the lid includes a center adjuster rotation groove; and the adjuster rotation groove is disposed in an inner periphery of a lid through hole of the lid formed inner with respect to the lid bendable groove, and is depressed outwardly in the radial direction with respect to the rotational axis of the worm shaft.

According to still another aspect, in addition to any one of the above aspects, the steering device is configured such that: the lid engagement part of the lid includes a center adjuster detachment projection; and the center adjuster detachment projection projects from a tip of the lid engagement part in the direction of the rotational axis of worm shaft.

According to still another aspect, in addition to any one of the above aspects, the steering device is configured such that: the lid engagement part of the lid includes a thickness gradual-decrease sections; and the thickness gradual-decrease section is disposed between the lid engagement projection and the lid body, and increases in cross sectional area perpendicular to the rotational axis of the worm shaft, as approaching from the lid body to the lid engagement projection in the direction of the rotational axis of the worm shaft.

According to still another aspect, in addition to any one of the above aspects, the steering device is configured such that: the center adjuster locking groove includes a first surface structured to be in contact with the lid engagement projection wherein the first surface is perpendicular to the rotational axis of the worm shaft; and the lid engagement projection includes a surface structured to be in contact with the center adjuster locking groove and be inclined with respect to the rotational axis of the worm shaft.

According to still another aspect, in addition to any one of the above aspects, the steering device is configured such that: the biasing member is the spring having the arc shape; the lid includes the lid body including a spring restriction projection; the spring restriction projection is disposed in a part of the lid body in the circumferential direction around the rotational axis of the worm shaft; the spring restriction projection is formed such that the lid body is a predetermined distance apart in the direction of the rotational axis of the worm shaft, from a surface of the holder tubular wall facing the lid body; and the spring restriction projection projects toward the holder with respect to a part adjacent to the spring restriction projection in the direction of the rotational axis of the worm shaft.

According to still another aspect, in addition to any one of the above aspects, the steering device is configured such that: the holder includes a retainer hook engagement groove; the retainer hook engagement groove includes a surfaces being perpendicular to the rotational axis of the worm shaft and being in contact with the holder retainer hook; the lid includes the lid body and a holder retainer retaining the holder; the holder retainer projects from the lid body toward the holder in the direction of the rotational axis of the worm shaft; the holder retainer includes a holder retainer hook; and the holder retainer hook is disposed in a tip of the holder retainer, and includes a surface inclined with respect to the rotational axis of the worm shaft and structured to be in contact with the retainer hook engagement groove.

According to still another aspect, in addition to any one of the above aspects, the steering device is configured such that: the holder includes the retainer hook engagement groove; the lid includes the lid body and the holder retainer retaining the holder; the holder retainer projects from the lid body toward the holder in the direction of the rotational axis of the worm shaft; the holder retainer includes the holder retainer hook and a holder retainer slope; the holder retainer hook is disposed in an inward surface of the tip of the holder retainer in the radial direction with respect to the rotational axis of the worm shaft; and the holder retainer slope is disposed in an outward surface of the tip of the holder retainer in the radial direction with respect to the rotational axis of the worm shaft, and is inclined with respect to the rotational axis of the worm shaft.

According to still another aspect, in addition to any one of the above aspects, the steering device is configured such that: the holder includes the retainer engagement groove; the retainer engagement groove is shaped groovy to extend in the direction of the rotational axis of the worm shaft, and is disposed in an outer periphery of the holder tubular wall; the lid includes the lid body and the holder retainer retaining the holder; the holder retainer projects from the lid body toward the holder in the direction of the rotational axis of the worm shaft, and engages with the retainer engagement groove; and the holder retainer in engagement with the retainer engagement groove is less in outer diameter than a part of the holder tubular wall adjacent to the retainer engagement groove.

According to still another aspect, in addition to any one of the above aspects, the steering device is configured such that: the center adjuster retainer has the tubular shape defining the center adjuster container space inside the center adjuster retainer, and includes the inner periphery including the center adjuster locking groove shaped annular; the lid is made of a resin material, and includes the lid body including the lid engagement part; the lid engagement part projects from the lid body in the direction away from the holder in the direction of the rotational axis of the worm shaft, and includes a lid engagement projection in the tip of the lid engagement part; and the lid engagement projection projects from the lid engagement part outwardly in the radial direction with respect to the rotational axis of the worm shaft, and engages with the center adjuster locking groove, and is greater in outer diameter in the radial direction than a part of the holder tubular wall adjacent to the retainer engagement groove.

According to still another aspect, in addition to any one of the above aspects, the steering device is configured such that the lid includes a marker that allows a rotational position of the lid around the rotational axis of the worm shaft to be visually inspected from an outside of the gear housing.

According to still another aspect, in addition to any one of the above aspects, the steering device is configured such that the lid is allowed to engage with the holder, at only one rotational position with respect to the holder in the circumferential direction around the rotational axis of the worm shaft.

According to still another aspect, in addition to any one of the above aspects, the steering device is configured such that the collar is made of a material less in friction coefficient than a material of the holder and a material of the lid.

According to still another aspect, in addition to any one of the above aspects, the steering device is configured such that the lid is made of a material less in Young's modulus than a material of the holder and a material of the collar.

According to still another aspect, in addition to any one of the above aspects, the steering device is configured such that: the lid includes a collar supporter supporting the outer peripheral surface of the collar; and the collar supporter projects toward the holder in the direction of the rotational axis of the worm shaft, and decreases in thickness in the radial direction with respect to the rotational axis of the worm shaft, as approaching the axis crossing the rotational axis of the worm shaft and extending in the gear engagement direction.

According to still another aspect, in addition to any one of the above aspects, the steering device is configured such that: the center adjuster retainer of the gear housing has the tubular shape defining the center adjuster container space inside the center adjuster retainer; the center adjuster container space has a circular shape at a cross section perpendicular to the rotational axis of the worm shaft; the center adjuster has a circular outline at a cross section perpendicular to the rotational axis of the worm shaft; the center adjuster includes an outer peripheral surface that is in contact with an inner peripheral surface of the center adjuster retainer; and the center adjuster and the center adjuster retainer are structured to determine a position of the center adjuster with respect to the center adjuster retainer, due to the contact between the outer peripheral surface of the center adjuster and the inner peripheral surface of the center adjuster retainer.

According to still another aspect, in addition to any one of the above aspects, the steering device is configured such that: the holder includes the holder bottom, the holder tubular wall, and a holder-positioning projection; the holder-positioning projection projects from the holder tubular wall in a direction away from the collar, in the direction of the rotational axis of the worm shaft; the center adjuster retainer includes a holder-positioning-projection engagement groove; the holder-positioning-projection engagement groove engages with the holder-positioning projection, and thereby restricts relative rotation of the holder with respect to the center adjuster retainer in a rotational direction around the rotational axis of the worm shaft.

According to still another aspect, in addition to any one of the above aspects, the steering device is configured such that: the holder-positioning-projection engagement groove is a groove that is formed in an inner periphery of the center adjuster retainer and is open in the direction of the rotational axis of the worm shaft; and the holder-positioning projection has a gap with the holder-positioning-projection engagement groove in the radial direction with respect to the rotational axis of the worm shaft.

According to still another aspect, in addition to any one of the above aspects, the steering device is configured such that the holder-positioning projection includes in its tip a tapered section inclined to be tapered.

According to still another aspect, in addition to any one of the above aspects, the steering device is configured such that: the holder includes the holder bottom and the holder tubular wall; and the center adjuster retainer includes a holder-positioning contact part that is in contact with the holder bottom in the direction of the rotational axis of the worm shaft and thereby performs positioning of the holder in the direction of the rotational axis of the worm shaft with respect to the center adjuster retainer.

The invention claimed is:

1. A steering device comprising:
a steering shaft structured to rotate in response to rotation of a steering wheel;
a worm wheel linked to the steering shaft;
a worm shaft engaging with the worm wheel and including a worm first end and a worm second end as a pair of ends;
an electric motor that is structured to supply rotational force to the worm shaft and includes a motor shaft connected to the worm first end of the worm shaft;
a gear housing including a worm gear container and a center adjuster retainer, wherein the worm gear container contains the worm wheel and the worm shaft, and wherein the center adjuster retainer surrounds the worm second end;
a bearing supporting the worm second end;
a center adjuster that is disposed in the center adjuster retainer and includes a holder and a collar, wherein the collar is disposed in the holder and retains the bearing so as to allow the bearing to move relatively with respect to the holder in a gear engagement direction that is a direction of engagement between the worm wheel and the worm shaft; and
a biasing member disposed in the center adjuster and structured to bias the bearing in a direction inclined with respect to the gear engagement direction,
wherein:
the biasing member is a spring having an arc shape;
the collar includes a spring winding part and a protrusion part;
the spring is wound around the spring winding part;
the protrusion part protrudes outwardly in a radial direction with respect to a rotational axis of the worm shaft, in comparison with the spring winding part;
the spring is in contact with an outer periphery of the spring winding part via at least two contact parts; and
each of the contact parts is positioned on a virtual circle that has a center shifted from an axis crossing the rotational axis of the worm shaft and extending in the gear engagement direction.

2. The steering device as claimed in claim 1, wherein:
the holder includes holder slide surfaces composed of a holder first slide surface and a holder second slide surface that are a pair of surfaces facing each other;
the collar is disposed between the holder first slide surface and the holder second slide surface, and retains the bearing;
the collar includes collar slide surfaces composed of a collar first slide surface and a collar second slide surface; and
the collar first slide surface is in sliding contact with the holder first slide surface, and the collar second slide surface is in sliding contact with the holder second slide surface.

3. The steering device as claimed in claim 2, wherein:
the collar includes a collar body and an opening;
the collar body has an arc shape, and retains the bearing inside the collar body; and
the bearing includes an outer periphery composed of a first part surrounded by the collar body and a second part facing the opening.

4. The steering device as claimed in claim 3, wherein the collar body exerts biasing force toward a center of the bearing, on a contact part with the outer periphery of the bearing.

5. The steering device as claimed in claim 2, wherein the collar includes a lubrication groove disposed in an end surface of the collar in a direction of a rotational axis of the worm shaft.

6. The steering device as claimed in claim 2, wherein:
the spring winding part includes a first end in an opposite side to the protrusion part in a direction of the rotational axis of the worm shaft; and
the first end of the spring winding part protrudes outwardly in the radial direction.

7. The steering device as claimed in claim 6, wherein the spring is wound in a region of the spring winding part wherein the region overlaps with the bearing in the radial direction with respect to the rotational axis of the worm shaft.

8. The steering device as claimed in claim 1, wherein:
the holder includes a spring locking part on which the spring is locked;
the spring locking part is disposed in an opposite side to the contact parts between the spring and the spring winding part, across the rotational axis of the worm shaft.

9. The steering device as claimed in claim 1, wherein:
the center adjuster includes a lid;
the collar of the center adjuster includes a collar first end surface and a collar second end surface that are a pair of end surfaces in a direction of a rotational axis of the worm shaft;
the holder of the center adjuster includes a holder bottom and a holder tubular wall;
the holder bottom is in contact with the collar first end surface;
the holder tubular wall is continuous with the holder bottom, and surrounds an outer periphery of the collar;
the holder tubular wall includes an end in an opposite side to the holder bottom in the direction of the rotational axis of the worm shaft wherein the end of the holder tubular wall is adjacent to the lid of the center adjuster; and
the lid is in contact with the collar second end surface.

10. The steering device as claimed in claim 9, wherein:
the center adjuster retainer of the gear housing has a tubular shape defining a center adjuster container space inside the center adjuster retainer, and includes an inner periphery including a center adjuster locking groove shaped annular; and
the lid of the center adjuster includes a lid engagement projection engaging with the center adjuster locking groove.

11. The steering device as claimed in claim 1, wherein:
the center adjuster retainer of the gear housing has a tubular shape defining a center adjuster container space inside the center adjuster retainer;
the center adjuster container space has a circular shape at a cross section perpendicular to a rotational axis of the worm shaft;
the center adjuster has a circular outline at a cross section perpendicular to the rotational axis of the worm shaft;
the center adjuster includes an outer peripheral surface that is in contact with an inner peripheral surface of the center adjuster retainer; and
the center adjuster and the center adjuster retainer are structured to determine a position of the center adjuster with respect to the center adjuster retainer, due to the contact between the outer peripheral surface of the center adjuster and the inner peripheral surface of the center adjuster retainer.

* * * * *